US012732612B2

(12) United States Patent
Wang et al.

(10) Patent No.: US 12,732,612 B2
(45) Date of Patent: Sep. 8, 2026

(54) ADAPTIVE DEPENDENT QUANTIZATION

(71) Applicants: Beijing Bytedance Network Technology Co., Ltd., Beijing (CN); Bytedance Inc., Los Angeles, CA (US)

(72) Inventors: Yang Wang, Beijing (CN); Li Zhang, San Diego, CA (US); Kai Zhang, San Diego, CA (US); Zhipin Deng, Beijing (CN); Na Zhang, Beijing (CN)

(73) Assignees: BEIJING BYTEDANCE NETWORK TECHNOLOGY CO., LTD., Beijing (CN); BYTEDANCE INC., Los Angelels, CA (US)

( * ) Notice: Subject to any disclaimer, the term of this patent is extended or adjusted under 35 U.S.C. 154(b) by 237 days.

(21) Appl. No.: 18/476,718

(22) Filed: Sep. 28, 2023

(65) Prior Publication Data

US 2024/0022725 A1 Jan. 18, 2024

Related U.S. Application Data

(63) Continuation of application No. PCT/CN2022/084990, filed on Apr. 2, 2022.

(30) Foreign Application Priority Data

Apr. 2, 2021 (WO) ................ PCT/CN2021/085293

(51) Int. Cl.
*H04N 19/124* (2014.01)
*H04N 19/159* (2014.01)
(Continued)

(52) U.S. Cl.
CPC ......... *H04N 19/124* (2014.11); *H04N 19/159* (2014.11); *H04N 19/186* (2014.11); *H04N 19/70* (2014.11)

(58) Field of Classification Search
CPC .. H04N 19/124; H04N 19/159; H04N 19/186; H04N 19/70; H04N 19/126; H04N 19/176
See application file for complete search history.

(56) References Cited

U.S. PATENT DOCUMENTS

2021/0084304 A1* 3/2021 Schwarz .............. H04N 19/176
2022/0321886 A1* 10/2022 Schwarz ................ H04N 19/61

FOREIGN PATENT DOCUMENTS

CN 107439015 A 12/2017
CN 110944191 A 3/2020
(Continued)

OTHER PUBLICATIONS

Document: JVET-T2001-v2, Bross, B., et al., "Versatile Video Coding Editorial Refinements on Draft 10," Joint Video Experts Team (JVET) of ITU-T SG 16 WP 3 and ISO/IEC JTC 1/SC 29 20th Meeting, by teleconference, Oct. 7-16, 2020, 512 pages.
(Continued)

*Primary Examiner* — Farzana Hossain
(74) *Attorney, Agent, or Firm* — Conley Rose, P.C.

(57) ABSTRACT

A method of processing video data includes selecting a first dependent quantization (DQ) parameter to be applied to a first video unit within a sequence; selecting a second DQ parameter to be applied to a second video unit within the sequence, wherein the second DQ parameter is different from the first DQ parameter; and converting between a video media file and a bitstream based on the first DQ parameter and the second DQ parameter that were selected. A corresponding video coding apparatus and non-transitory computer readable medium are also disclosed.

19 Claims, 19 Drawing Sheets

100

(51) Int. Cl.
*H04N 19/186* (2014.01)
*H04N 19/70* (2014.01)

(56) References Cited

FOREIGN PATENT DOCUMENTS

| | | | |
|---|---|---|---|
| CN | 111131819 | A | 5/2020 |
| WO | 2018207956 | A1 | 11/2018 |

OTHER PUBLICATIONS

Retrieved from the internet: https://vcgit.hhi.fraunhofer.de/jvet/VVCSoftware_VTM/-/tags/VTM-12.0, Jan. 9, 2024, 1 page.
Document: JVET-Q0243-v2, Schwarz, H., et al., "Additional support of dependent quantization with 8 states," Joint Video Experts Team (JVET) of ITU-T SG 16 WP 3 and ISO/IEC JTC 1/SC 29/WG 11 17th Meeting: Brussels, BE, Jan. 7-17, 2020, 12 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 202, 512 pages.
Retrieved from the internet: https://vcgit.hhi.fraunhofer.de/jvet/VVCSoftware_VTM/-/tags/VTM-8.0, Jan. 9, 2024, 1 page.
International Search Report from PCT Application No. PCT/CN2022/084990 dated Jul. 4, 2022, 10 pages.

* cited by examiner

| current state | next state for ... | |
|---|---|---|
| | (k & 1)==0 | (k & 1)==1 |
| 0 | 0 | 0 |
| 1 | 1 | 1 |
| 2 | 2 | 2 |
| 3 | 3 | 3 |

1500

Bitstream 1502 1504 1506 1508 1512 1514

| DCI | VPS | SPS | PPS | PH | Picture |
|---|---|---|---|---|---|
| DCI NAL Unit | VPS NAL Unit | SPS NAL Unit | PPS NAL Unit | PH NAL Unit | |

1520 Slice Header Slice 1518

VCL NAL Unit

1520 Slice Header Slice 1518

VCL NAL Unit

1520 Slice Header Slice 1518

VCL NAL Unit

Coded Video Sequence
1516

ADAPTIVE DEPENDENT QUANTIZATION

CROSS-REFERENCE TO RELATED APPLICATIONS

This patent application is a continuation of International Patent Application No. PCT/CN2022/084990, filed on Apr. 2, 2022, which claims the priority to and benefits of International Application No. PCT/CN2021/085293 filed on Apr. 2, 2021. All the aforementioned patent applications are hereby incorporated by reference in their entireties.

TECHNICAL FIELD

The present disclosure is generally related to video coding and, in particular, to dependent quantization and other coding tools in image/video coding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed aspects/embodiments provide techniques that permit different dependent quantization (DQ) parameters to be applied to different video units within a sequence. The techniques also permit quantization parameters to be changed within a video unit. That is, an adaptive dependent quantization selection with multiple choices (e.g., different number of states or different context modeling/entropy coding method) is proposed for image/video coding wherein more than one way of DQ implementation is allowed. Because of this, coding efficiency and flexibility is improved.

A first aspect relates to a method of processing video data. The method includes selecting a first dependent quantization (DQ) parameter to be applied to a first video unit within a sequence; selecting a second DQ parameter to be applied to a second video unit within the sequence, wherein the second DQ parameter is different from the first DQ parameter; and performing a conversion between a video media file and a bitstream based on the first DQ parameter and the second DQ parameter that were selected.

Optionally, in any of the preceding aspects, another implementation of the aspect provides that the first video unit and the second video unit are each a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block (PB), a transform block (TB), or a region containing more than one sample or pixel.

Optionally, in any of the preceding aspects, another implementation of the aspect provides that the first DQ parameter or the second DQ parameter comprises a number of states N, wherein N is equal to $2^k$, and wherein k is one of 2, 3, 4, 5, 6 or 7.

Optionally, in any of the preceding aspects, another implementation of the aspect provides that the set of available DQ parameters comprises M choices, and wherein M is equal to 2 and the set of available DQ parameters comprises {4-state DQ, 8-state DQ}, {4-state DQ, 16-state DQ}, or {8-state DQ, 16-state DQ}, or equal to 3 and the set of available DQ parameters comprises {4-state DQ, 8-state DQ, 16-state DQ}.

Optionally, in any of the preceding aspects, another implementation of the aspect provides that the first DQ parameter is selected from a first set of available DQ parameters, wherein the second DQ parameter is selected from a second set of available DQ parameters; and wherein the first set of available DQ parameters is different from the second set of available DQ parameters.

Optionally, in any of the preceding aspects, another implementation of the aspect provides that the first DQ parameter is selected from a first set of states for a first color component, wherein the second DQ parameter is selected from a second set of states for a second color component; and wherein the first color component is different than the second color component.

Optionally, in any of the preceding aspects, another implementation of the aspect provides that the first DQ parameter is a first number of states and the first video unit is a first color component, and wherein the second DQ parameter is a second number of states and the second video unit is a second color component.

Optionally, in any of the preceding aspects, another implementation of the aspect provides that the first color component is one of Y, Cb, or Cr from a YCbCr color space or is one of R, G, B in an RGB color space, where Y is a luma component, Cb is a blue chroma component, Cr is a red chroma component, R is a red color component, G is a green color component, and B is a blue color component.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on profile, tier, level, layers, or combinations thereof.

Optionally, in any of the preceding aspects, another implementation of the aspect provides that the first DQ parameter is a first number of states or selected from a first set of states, wherein the second DQ parameter is a second number of states or selected from a second set of states, wherein the first DQ parameter is applied to an I slice, and wherein the second DQ parameter is applied to a P slice or a B slice, where the I slice indicates intra prediction, where the P slice indicates uni-directional inter prediction, and where the B slice indicates bi-directional inter prediction.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on a temporal layer identifier (ID).

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on a prediction mode in the first video unit and the second video unit.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on whether or not the first video unit or the second video unit is coded with transform skip.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on whether the first video unit or the second video unit is coded with regular residual coding (RRC) or transform skip residual coding (TSRC).

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on whether one or more coding tools are applied or not.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on a size or dimension of the first video unit or the second video unit.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter depend on block partitioning of the first video unit or the second video unit.

Optionally, in any of the preceding aspects, another implementation of the aspect provides further comprising selecting a third DQ parameter to be applied to the first video unit and selecting a fourth DQ parameter to be applied to the second video unit, wherein the third DQ parameter is different from the first DQ parameter, and wherein the fourth DQ parameter is different from the second DQ parameter.

Optionally, in any of the preceding aspects, another implementation of the aspect provides that the first DQ parameter and the second DQ parameter are each included at a level of a bitstream where the first video unit and the second video unit are included in the bitstream, and wherein the first video unit and the second video unit are each a transform unit (TU), a transform block (TB), a coding unit (CU), or a coding block (CB).

Optionally, in any of the preceding aspects, another implementation of the aspect provides that the first DQ parameter and the second DQ parameter are each included at a level of a bitstream different than where the first video unit and the second video unit are included in the bitstream, wherein the first video unit and the second video unit are each a coding unit (CU) or a transform unit (TU), and wherein the level of the bitstream included is a coding tree unit (CTU).

Optionally, in any of the preceding aspects, another implementation of the aspect provides that whether the first DQ parameter and the second DQ parameter are each included as a syntax element in a bitstream depends on a condition, and wherein the condition is based on a current block, a neighboring block, a block dimension, a prediction mode, a transform mode, a residual coding mode, a coded block flag (CBF) value, a position of non-zero coefficients in a block, and a position of a last non-zero coefficient in the block.

Optionally, in any of the preceding aspects, another implementation of the aspect provides that the first DQ parameter or the second DQ parameter comprises a number of states, and wherein the number of states is not included in the bitstream when a coded block flag (CBF) value is equal to 0.

Optionally, in any of the preceding aspects, another implementation of the aspect provides that the first DQ parameter or the second DQ parameter comprises a number of states, and wherein the number of states is not included in the bitstream when only a direct current (DC) coefficient is present.

Optionally, in any of the preceding aspects, another implementation of the aspect provides that the first DQ parameter and the second DQ parameter are each included as a syntax element in a bitstream, and wherein the syntax element is binarized with fixed length coding, truncated unary coding, unary coding, or a flag.

Optionally, in any of the preceding aspects, another implementation of the aspect provides that the first DQ parameter and the second DQ parameter are each included as a syntax element in a bitstream, and wherein the syntax element is bypass coded.

Optionally, in any of the preceding aspects, another implementation of the aspect provides that the first DQ parameter and the second DQ parameter are each included as a syntax element in a bitstream, and wherein the syntax element is context-coded.

Optionally, in any of the preceding aspects, another implementation of the aspect provides that the first DQ parameter is a first number of states or selected from a first set of states, wherein the second DQ parameter is a second number of states or selected from a second set of states, and wherein the first DQ parameter and the second DQ parameter are each derived from coded information in a bitstream instead of being explicitly included in the bitstream.

Optionally, in any of the preceding aspects, another implementation of the aspect provides that the coded information comprises a size or dimension of the first video unit and the second video unit, wherein an $N_1$-state DQ is used in the video unit when W*H is less than $T_1$, wherein an $N_2$-state DQ is used in the video unit when W*H is larger than or equal to $T_1$, wherein $N_1$ and $N_2$ are different states, wherein W is a width of the video unit, wherein H is a height of the video unit, and wherein $T_1$ is an integer.

Optionally, in any of the preceding aspects, another implementation of the aspect provides that the coded information comprises a size or dimension of the first video unit and the second video unit, wherein an $N_1$-state DQ is used in the video unit when W/H or H/W is less than $T_2$, wherein an $N_2$-state DQ is used in the video unit when W/H or H/W is larger than or equal to $T_2$, wherein $N_1$ and $N_2$ are different states, wherein W is a width of the video unit, wherein H is a height of the video unit, and wherein $T_2$ is an integer.

Optionally, in any of the preceding aspects, another implementation of the aspect provides that the coded information comprises a number of coefficients in the first video unit and the second video unit, wherein an $N_1$-state DQ is used in the video unit when the number of coefficients is less than $T_1$, wherein an $N_2$-state DQ is used in the video unit when the number of coefficients is larger than or equal to $T_1$, wherein $N_1$ and $N_2$ are different states, and wherein $T_1$ is an integer.

Optionally, in any of the preceding aspects, another implementation of the aspect provides that the coded information comprises a last scan position, wherein an $N_1$-state DQ is used in the video unit when the last scan position is less than $T_1$, wherein an $N_2$-state DQ is used in the video unit when the last scan position is larger than or equal to $T_1$, wherein $N_1$ and $N_2$ are different states, and wherein $T_1$ is an integer.

Optionally, in any of the preceding aspects, another implementation of the aspect provides that the coded information comprises a color component, wherein an $N_1$-state DQ is used in a Y component in a YCbCr color format, wherein an $N_2$-state DQ is used in a Cb component and a Cr component in the YCbCr color format, and wherein $N_1$ and $N_2$ are different states.

Optionally, in any of the preceding aspects, another implementation of the aspect provides that the coded information comprises a prediction mode, and wherein the prediction mode comprises one of an intra prediction mode, an inter prediction mode, an intra block copy (IBC) mode, and a palette mode.

Optionally, in any of the preceding aspects, another implementation of the aspect provides that the coded information comprises a transform mode, and wherein the transform mode comprises one of a transform skip mode, a non-transform-skip mode, an explicit multiple transform set (MTS) mode, an implicit MTS mode, and different MTS types.

Optionally, in any of the preceding aspects, another implementation of the aspect provides that the coded information comprises a residual coding method, and wherein the residual coding method comprises regular residual coding (RRC) or transform skip based residual coding (TSRC).

Optionally, in any of the preceding aspects, another implementation of the aspect provides that the coded information comprises an indication of whether or not a coding tool has been applied to a current block, and wherein the coding tool comprises matrix-based intra-prediction (MIP), multiple reference line (MRL), inter frame stripe prediction (ISP), decoder-side intra mode derivation (DIMD), MTS, Low Frequency Non-Separable Transform (LFNST), sub-block transform (SBT), geometric partition (GEO), combined inter- and intra-prediction (CUP), merge mode with motion vector difference (MMVD), Subblock-based Temporal Motion Vector Prediction (SbTMVP), overlapped block motion compensation (OBMC), Frame Rate Up-Conversion (FRUC), IBC, Sign Prediction, Sign hiding, or Adaptive scanning ordering.

Optionally, in any of the preceding aspects, another implementation of the aspect provides that the coded information comprises a number of states, residual information, or reconstructed samples corresponding to a neighboring block of a current block.

Optionally, in any of the preceding aspects, another implementation of the aspect provides that the conversion comprises encoding the video media file into the bitstream.

Optionally, in any of the preceding aspects, another implementation of the aspect provides that the conversion comprises decoding the bitstream to obtain the media file.

A second aspect relates to an apparatus for coding video data comprising a processor and a non-transitory memory with instructions thereon, wherein the instructions upon execution by the processor cause the processor to: select a first dependent quantization (DQ) parameter to be applied to a first video unit within a sequence; select a second DQ parameter to be applied to a second video unit within the sequence, wherein the second DQ parameter is different from the first DQ parameter; and convert between a video media file and a bitstream based on the first DQ parameter and the second DQ parameter that were selected.

A third aspect relates to a non-transitory computer readable medium comprising a computer program product for use by a coding apparatus, the computer program product comprising computer executable instructions stored on the non-transitory computer readable medium that, when executed by one or more processors, cause the coding apparatus to: select a first dependent quantization (DQ) parameter to be applied to a first video unit within a sequence; select a second DQ parameter to be applied to a second video unit within the sequence, wherein the second DQ parameter is different from the first DQ parameter; and convert between a video media file and a bitstream based on the first DQ parameter and the second DQ parameter that were selected.

A fourth aspect relates to a non-transitory computer-readable storage medium storing instructions that cause a processor to: select a first dependent quantization (DQ) parameter to be applied to a first video unit within a sequence; select a second DQ parameter to be applied to a second video unit within the sequence, wherein the second DQ parameter is different from the first DQ parameter; and convert between a video media file and a bitstream based on the first DQ parameter and the second DQ parameter that were selected.

A fifth aspect relates to a non-transitory computer-readable recording medium storing a bitstream of a video which is generated by a method performed by a video processing apparatus, wherein the method comprises: select a first dependent quantization (DQ) parameter to be applied to a first video unit within a sequence; select a second DQ parameter to be applied to a second video unit within the sequence, wherein the second DQ parameter is different from the first DQ parameter; and convert between a video media file and a bitstream based on the first DQ parameter and the second DQ parameter that were selected.

A sixth aspect relates to a method for storing bitstream of a video, comprising: selecting a first dependent quantization (DQ) parameter to be applied to a first video unit within a sequence; selecting a second DQ parameter to be applied to a second video unit within the sequence, wherein the second DQ parameter is different from the first DQ parameter; and generating the bitstream based on the first DQ parameter selected and the second DQ parameter selected; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

H.266 terminology is used in some description only for ease of understanding and not for limiting scope of the disclosed techniques. As such, the techniques described herein are applicable to other video codec protocols and designs also.

Video coding standards have evolved primarily through the development of the well-known International Telecommunication Union-Telecommunication (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards.

Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM).

In April 2018, the Joint Video Expert Team (JVET) between VCEG (Q6/16) and ISO/IEC JTC1 SC29/WG11 (MPEG) was created to work on the Versatile Video Coding (VVC) standard targeting at fifty percent (50%) bitrate reduction compared to HEVC. VVC version 1 was finalized in July 2020.

The techniques described herein may be applied to the existing video coding standard like HEVC, or the standard VVC. The latest version of VVC, including the VVC Test Model (CTM), is publicly available on the internet. The techniques may be also applicable to future video coding standards or video codecs.

Figure 5:
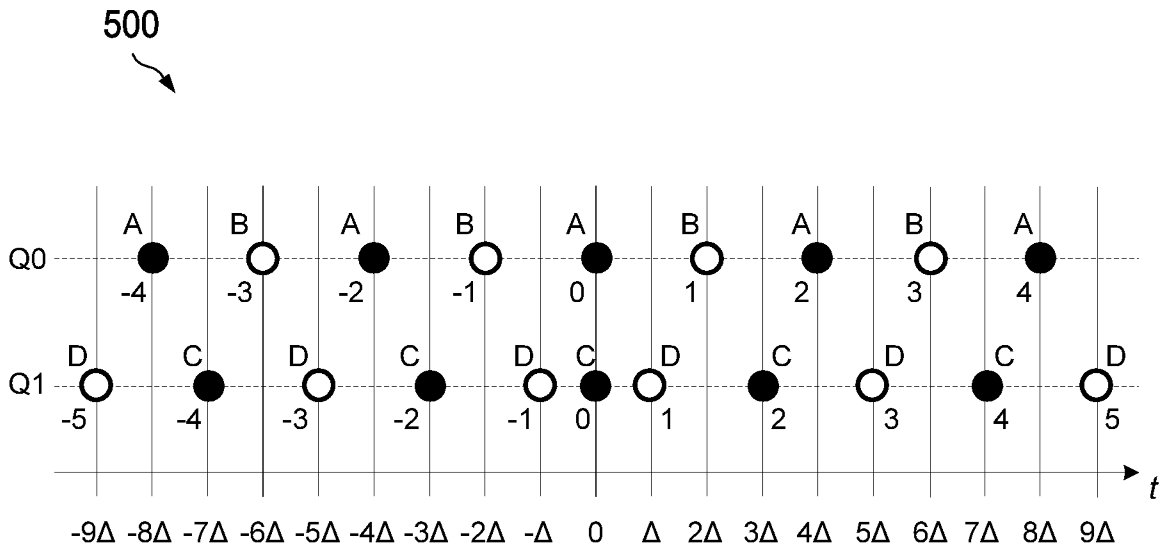
FIG. 5 is an illustration of the two scalar quantizers used in the proposed approach of dependent quantization.

The coding flow of a typical video coder/decoder (a.k.a., codec) is discussed. FIG. 5 is an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

Figure 1:
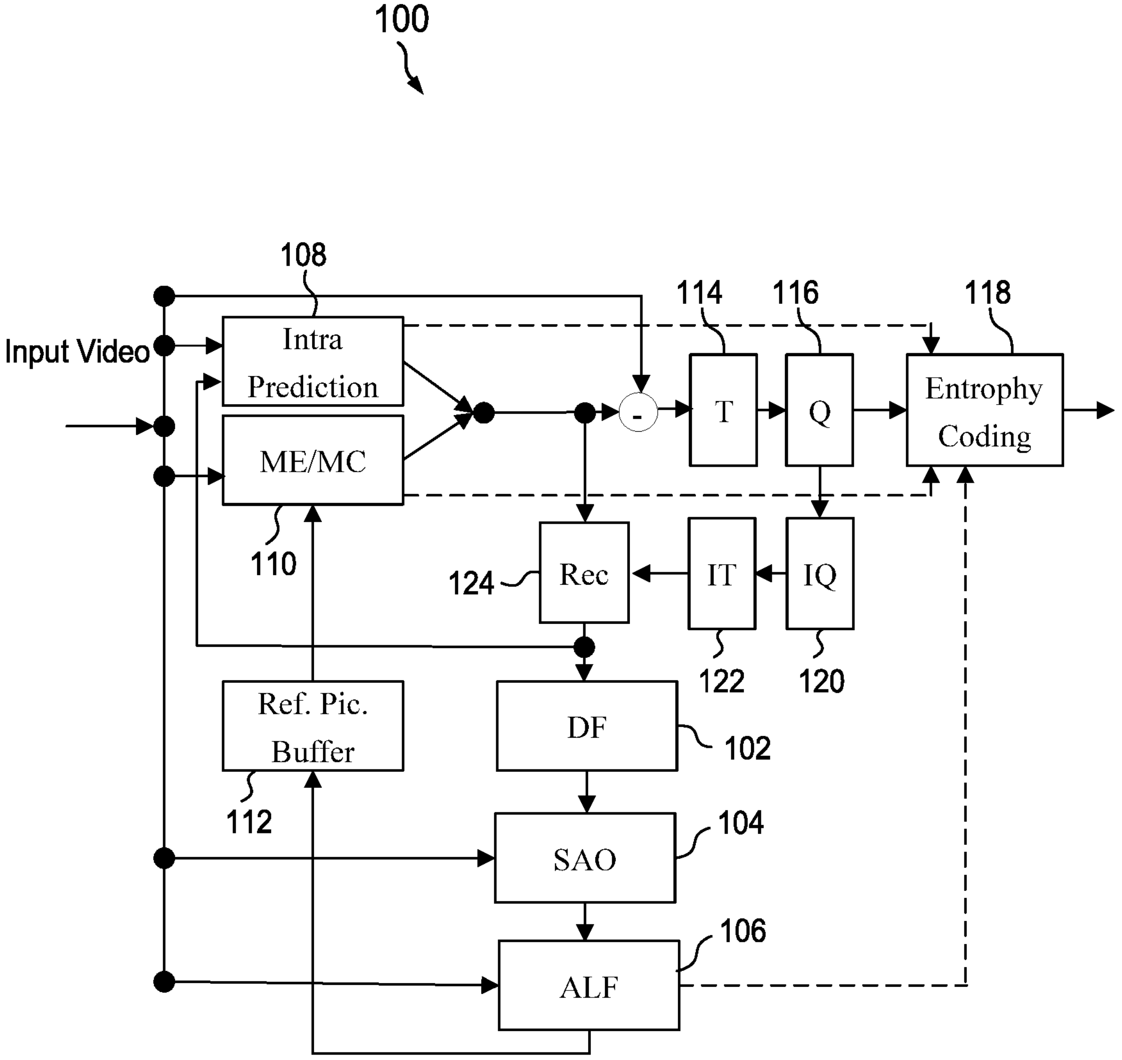
FIG. 1 is a schematic diagram of an encoder.

FIG. 1 is a schematic diagram of an encoder 100. The encoder 100 is suitable for implementing the techniques of VVC. The encoder 100 includes three in-loop filters, namely a deblocking filter (DF) 102, a sample adaptive offset (SAO) 104, and an ALF 106. Unlike the DF 102, which uses predefined filters, the SAO 104 and the ALF 106 utilize the original samples of the current picture to reduce the mean square errors between the original samples and the reconstructed samples by adding an offset and by applying a FIR filter, respectively, with coded side information signaling the offsets and filter coefficients. The ALF 106 is located at the last processing stage of each picture and can be regarded as a tool trying to catch and fix artifacts created by the previous stages.

The encoder 100 further includes an intra prediction component 108 and a motion estimation/compensation (MEIMC) component 110 configured to receive input video. The intra prediction component 108 is configured to perform intra prediction, while the ME/MC component 110 is configured to utilize reference pictures obtained from a reference picture buffer 112 to perform inter prediction. Residual blocks from inter prediction or intra prediction are fed into a transform component 114 and a quantization component 116 to generate quantized residual transform coefficients, which are fed into an entropy coding component 118. The entropy coding component 118 entropy codes the prediction results and the quantized transform coefficients and transmits the same toward a video decoder (not shown). Quantization components output from the quantization component 116 may be fed into an inverse quantization component 120, an inverse transform component 122, and a reconstruction (REC) component 124. The REC component 124 is able to output images to the DF 102, the SAO 104, and the ALF 106 for filtering prior to those images being stored in the reference picture buffer 112.

The input of the DF 102 is the reconstructed samples before in-loop filters. The vertical edges in a picture are filtered first. Then the horizontal edges in a picture are filtered with samples modified by the vertical edge filtering process as input. The vertical and horizontal edges in the coding tree blocks (CTBs) of each coding tree unit (CTU) are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

Transform coefficient coding is discussed.

In HEVC, transform coefficients of a coding block are coded using non-overlapped coefficient groups (CGs or subblocks), and each CG contains the coefficients of a 4×4 block of a coding block. In VVC, the selection of coefficient group sizes becomes dependent upon transform block (TB) size only, i.e., remove the dependency on channel type. As a consequence, various CGs (1×16, 2×8, 8×2, 2×4, 4×2 and 16×1) become available. The CGs inside a coding block, and the transform coefficients within a CG, are coded according to pre-defined scan orders. In order to restrict the maximum number of context-coded bins per pixel, the area of the TB and the color component are used to derive the maximum number of context-coded bins for a TB. For a luma TB, the maximum number of context-coded bins is equal to TB_zosize*1.75. For a chroma TB, the maximum number of context-coded bins (CCB) is equal to TB_zosize*1.25. Here, TB_zosize indicates the number of samples within a TB after coefficient zero-out. Note that the coded_sub_block_flag in transform skip residual mode is not considered for CCB count. Unlike HEVC where residual coding is designed for the statistics and signal characteristics of transform coefficient levels, two separate residual coding structures are employed for transform coefficients and transform skip coefficients, respectively.

Residual coding for transform coefficients is discussed.

In transform coefficient coding, a variable, remBinsPass1, is first set to the maximum number of context-coded bins (Mccb) and is decreased by one when a context-coded bin is signaled. While the remBinsPass1 is larger than or equal to four, the first coding pass, which includes the sig_coeff_flag, abs_level_gt1_flag, par_level_flag, and abs_level_gt2_flag, is coded by using context-coded bins. If the number of context-coded bins is not greater than Mccb in the first pass coding, the rest of the level information, which is indicated to be further coded in the first pass, is coded with syntax element of abs_remainder by using Golomb-rice code and bypass-coded bins. When the remBinsPass1 becomes smaller than 4 while coding the first pass, the rest of the coefficients, which are indicated to be further coded in the first pass, are coded with a syntax element of abs_remainder, and the coefficients which are not coded in the first pass are directly coded in the second pass with the syntax element of dec_abs_level by using Golomb-Rice code and bypass-coded bins. The remBinsPass1 is reset for every TB. The transition of using context-coded bins for the sig_coeff_flag, abs_level_gt1_flag, par_level_flag, and abs_level_gt2_flag to using bypass-coded bins for the rest of the coefficients only happens at most once per TB. For a coefficient subblock, if the remBinsPass1 is smaller than 4, the entire coefficient subblock is coded by using bypass-coded bins. After the above-mentioned level coding, the signs (sign_flag) for all scan positions with sig_coeff_flag equal to 1 is finally bypass coded.

The unified (same) rice parameter (ricePar) derivation is used for Pass 2 and Pass 3. The only difference is that baseLevel is set to 4 and 0 for Pass 2 and Pass 3, respectively. Rice parameter is determined not only based on a sum of absolute levels of neighboring five transform coefficients in local template, but the corresponding base level is also taken into consideration as follows:

$$\text{RicePara}=\text{RiceParTable}[\max(\min(31,\text{sumAbs}-5*\text{baseLevel}),0)] \quad (2\text{-}1)$$

Figure 2:
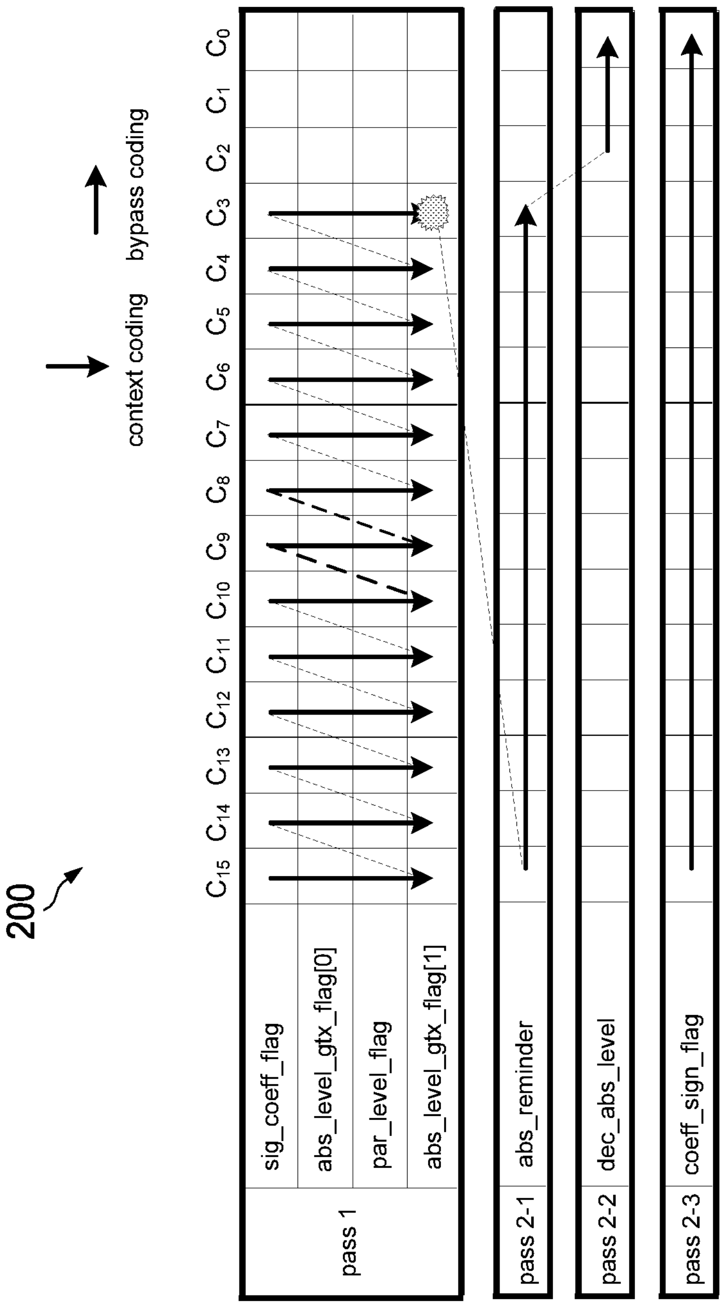
FIG. 2 illustrates an example residual coding structure for transform blocks.

FIG. 2 illustrates an example residual coding structure for transform blocks 200.

After the termination of the first (1st) subblock coding pass, the absolute value of each of the remaining yet-to-be-coded coefficients is coded by the syntax element dec_abs_level, which corresponds to a modified absolute level value with the zero-level value being conditionally mapped to a nonzero value. At the encoder side, the value of syntax element dec_abs_level is derived from the absolute level (absLevel), dependent quantizer state (QState) and the value of rice parameter (RicePara) as follows:

```
ZeroPos = ( QState < 2? 1 : 2 ) << RicePara
if (absLevel == 0)
  dec__abs__level = ZeroPos
else
  dec__abs__level = (absLevel <= ZeroPos) ? (absLevel − 1) : absLevel
```

Residual coding for transform skip is discussed.

Similar to HEVC, VVC supports transform skip mode. Transform skip mode is allowed for luma and chroma blocks. In transform skip mode, the statistical characteristics of the signal are different from those of transform coefficients, and applying transform skip mode to such residuals, in order to achieve energy compaction around low-frequency components, is generally less effective. Residuals with such characteristics are often found in screen content as opposed to natural camera captured content.

VVC allows the transform skip mode to be used for luma blocks of size up to MaxTsSize by MaxTsSize, where the value of MaxTsSize is signaled in the picture parameter set (PPS) and can be at most 32. When a coding unit (CU) is coded in transform skip mode, the prediction residual of the CU is quantized and coded using the transform skip residual coding process. This process is modified from the transform coefficient coding process described above. In transform skip mode, the residuals of a transform unit (TU) are also coded in units of non-overlapped subblocks of size 4×4. For better coding efficiency, some modifications are made to customize the residual coding process towards the residual signal's characteristics. The following summarizes the differences between transform skip residual coding and regular transform residual coding:

Forward scanning order is applied to scan the subblocks within a transform block and also the positions within a subblock;

no signalling of the last (x, y) position;

coded_sub_block_flag is coded for every subblock except for the last subblock when all previous flags are equal to 0;

sig_coeff_flag context modelling uses a reduced template, and context model of sig_coeff_flag depends on top and left neighboring values;

context model of abs_level_gt1 flag also depends on the left and top sig_coeff_flag values;

par_level_flag using only one context model;

additional greater than 3, 5, 7, 9 flags are signaled to indicate the coefficient level, one context for each flag;

rice parameter derivation using fixed order=1 for the binarization of the remainder values;

context model of the sign flag is determined based on left and above neighboring values and the sign flag is parsed after sig_coeff_flag to keep all context-coded bins together.

Figure 3:
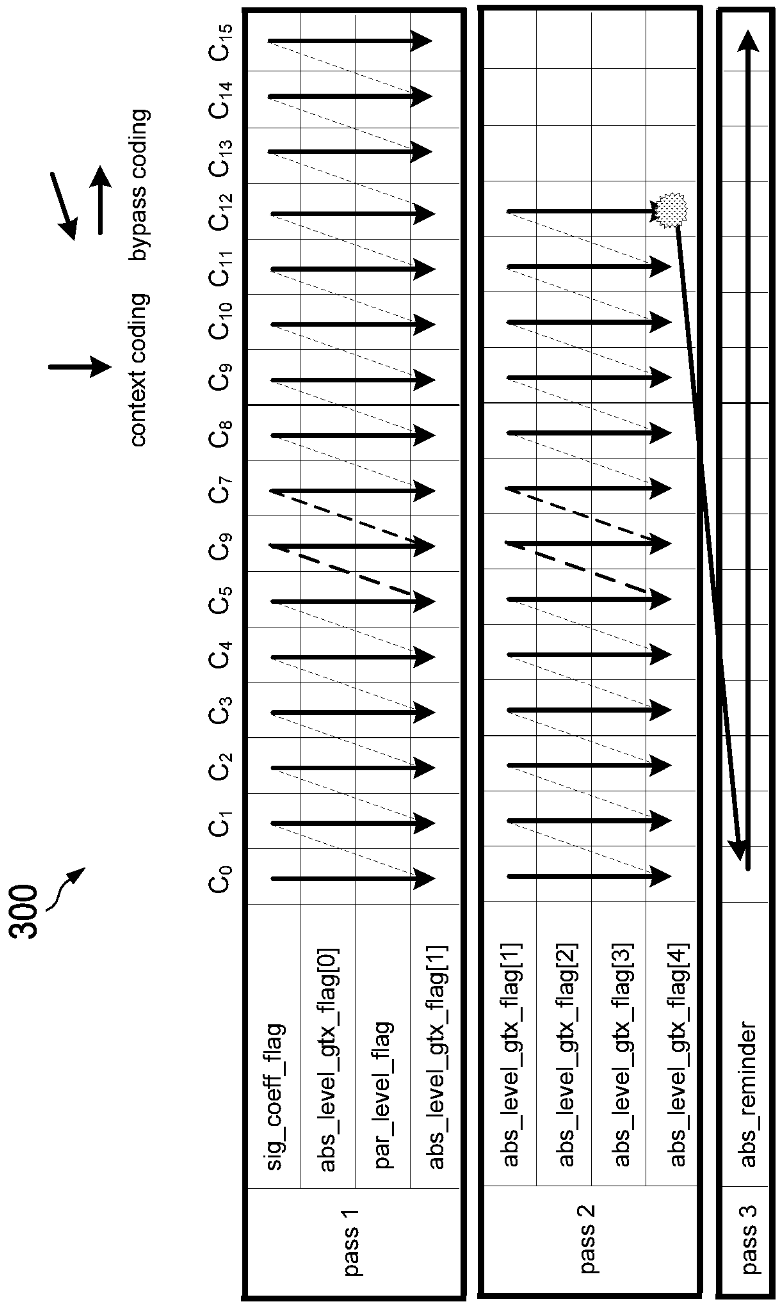
FIG. 3 illustrates an example of residual coding passes for transform skip blocks.

FIG. 3 illustrates an example of residual coding passes for transform skip blocks 300. For each subblock, if the coded_subblock_flag is equal to 1 (i.e., there is at least one non-zero quantized residual in the subblock), coding of the quantized residual levels is performed in three scan passes as follows:

First scan pass: significance flag (sig_coeff_flag), sign flag (coeff_sign_flag), absolute level greater than 1 flag (abs_level_gtx_flag[0]), and parity (par_level_flag) are coded. For a given scan position, if sig_coeff_flag is equal to 1, then coeff_sign_flag is coded, followed by the abs_level_gtx_flag[0] (which specifies whether the absolute level is greater than 1). If abs_level_gtx_flag [0] is equal to 1, then the par_level_flag is additionally coded to specify the parity of the absolute level.

Greater-than-x (second) scan pass: for each scan position whose absolute level is greater than 1, up to four abs_level_gtx_flag[i] for i=1 . . . 4 are coded to indicate if the absolute level at the given position is greater than 3, 5, 7, or 9, respectively.

Remainder (third) scan pass: The remainder of the absolute level abs_remainder are coded in bypass mode. The remainder of the absolute levels are binarized using a fixed rice parameter value of 1.

The bins in scan passes #1 and #2 (the first scan pass and the greater-than-x scan pass) are context coded until the maximum number of context-coded bins in the TU have been exhausted. The maximum number of context-coded bins in a residual block is limited to 1.75*block_width*block_height, or equivalently, 1.75 context-coded bins per sample position on average. The bins in the last scan pass (the remainder scan pass) are bypass coded. A variable, RemCcbs, is first set to the maximum number of context-coded bins for the block and is decreased by one each time a context-coded bin is coded. While RemCcbs is larger than or equal to four, syntax elements in the first coding pass, which includes the sig_coeff_flag, coeff_sign_flag, abs_level_gt1_flag and par_level_flag, are coded using context-coded bins. If RemCcbs becomes smaller than 4 while coding the first pass, the remaining coefficients that have yet to be coded in the first pass are coded in the remainder scan pass (pass #3).

After completion of first scan pass coding, if RemCcbs is larger than or equal to four, syntax elements in the second coding pass, which includes abs_level_gt3_flag, abs_level_gt5_flag, abs_level_gt1_flag, and abs_level_gt9_flag, are coded using context-coded bins. If the RemCcbs becomes smaller than 4 while coding the second scan pass, the remaining coefficients that have yet to be coded in the second scan pass are coded in the remainder scan pass (pass #3).

The star symbol in FIG. 3 marks the position when context coded bins are exhausted, at which point all remaining bins are coded using bypass coding.

Further, for a block not coded in the block differential pulse coded modulation (BDPCM) mode, a level mapping mechanism is applied to transform skip residual coding until the maximum number of context-coded bins has been reached. Level mapping uses the top and left neighboring coefficient levels to predict the current coefficient level in order to reduce signaling cost. For a given residual position, denote absCoeff as the absolute coefficient level before mapping and absCoeffMod as the coefficient level after mapping. Let Xo denote the absolute coefficient level of the left neighboring position and let Xi denote the absolute coefficient level of the above neighboring position. The level mapping is performed as follows:

```
pred = max(X0, X1);
if (absCoeff = = pred)
  absCoeffMod = 1;
else
  absCoeffMod = (absCoeff < pred) ? absCoeff + 1 : absCoeff;
```

Then, the absCoeffMod value is coded as described above. After all context-coded bins have been exhausted, level mapping is disabled for all remaining scan positions in the current block.

Context modeling for coefficient coding is discussed.

Figure 4:
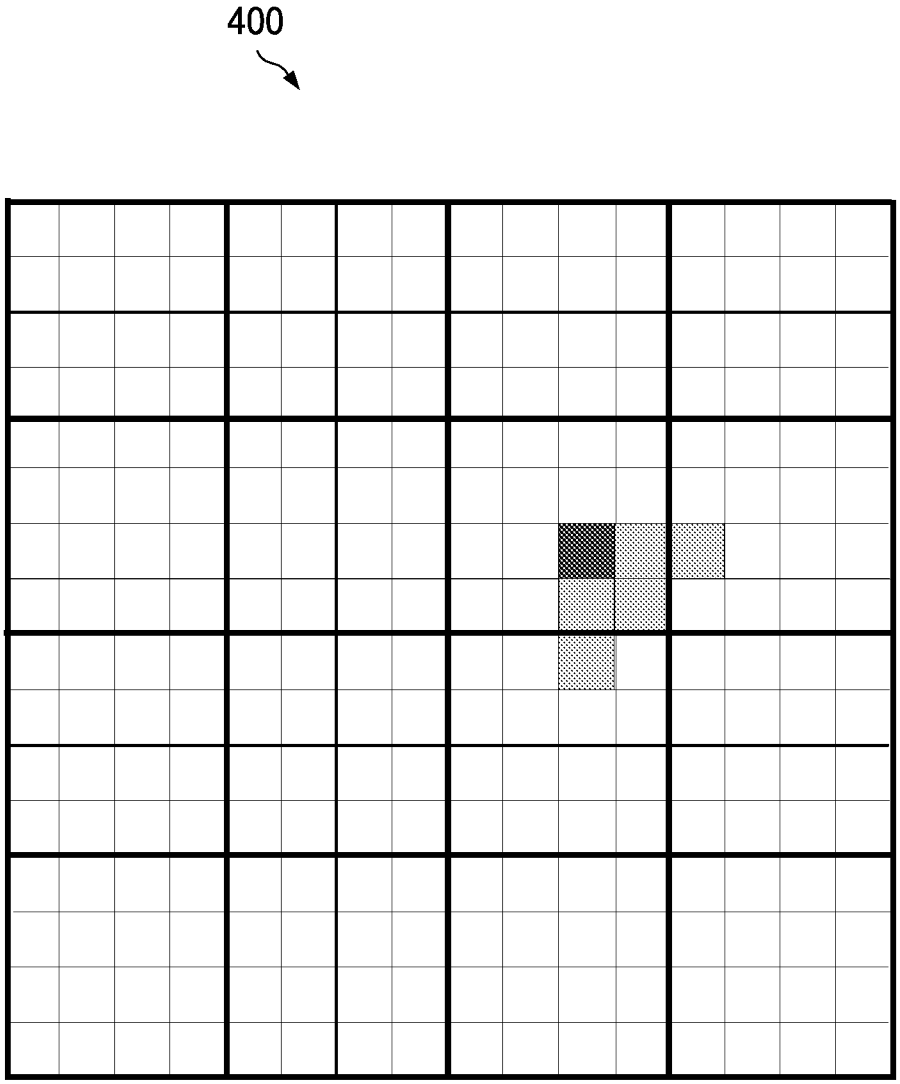
FIG. 4 illustrates a template used for selecting probability models.

FIG. 4 illustrates a template used for selecting probability models 400. The dark gray square specifies the current scan position and the lighter gray squares represent the local neighborhood used. The selection of probability models 400 for the syntax elements related to absolute values of transform coefficient levels depends on the values of the absolute levels or partially reconstructed absolute levels in a local neighborhood.

numSig: the number of non-zero levels in the local neighborhood.

sumAbs1: the sum of partially reconstructed absolute levels (absLevell) after the first pass in the local neighborhood.

sumAbs: the sum of reconstructed absolute levels in the local neighborhood.

diagonal position (d): the sum of the horizontal and vertical coordinates of a current scan position inside the transform block.

Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

In VVC, reduced 32-point multiple transform set (MTS) (RMTS32) based on skipping high frequency coefficients is used to reduce computational complexity of 32-point discrete sign transform (DST)-7/discrete cosine transform (DCT)-8, and it accompanies coefficient coding changes considering all types of zero-out (i.e., RMTS32 and the existing zero out for high frequency components in DCT2). Specifically, binarization of last non-zero coefficient position coding is coded based on reduced TU size, and the context model selection for the last non-zero coefficient position coding is determined by the original TU size. In addition, 60 context models are used to encode the sig_coeff_flag of transform coefficients. The selection of context model index is based on a sum of a maximum of five previously partially reconstructed absolute level called locSumAbsPass1 as follows:

If cIdx is equal to 0, ctxInc is derived as follows:

$$\text{ctxInc}=12*\text{Max}(0,\text{QState}-1)+\text{Min}((\text{locSumAbsPass1}+1)>>1,3)+(d<2?8:(d<5?4:0)) \quad (2\text{-}2)$$

Otherwise (cIdx is greater than 0), ctxInc is derived as follows:

$$\text{ctxInc}=36+8*\text{Max}(0,\text{QState}-1)+\text{Min}((\text{locSumAbsPass1}+1)>>1,3)+(d<2?4:0) \quad (2\text{-}3)$$

Dependent quantization is discussed.

The same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

FIG. 5 is an illustration of the two scalar quantizers used in the proposed approach of dependent quantization 500.

Dependent quantization with 4 states (4-state DQ) in VVC is discussed.

The two scalar quantizers used, denoted by Q0 and Q1, are illustrated in FIG. 5. The location of the available reconstruction levels is uniquely specified by a quantization step size A. The scalar quantizer used (Q0 or Q1) is not explicitly signaled in the bitstream. Instead, the quantizer used for a current transform coefficient is determined by the parities of the transform coefficient levels that precede the current transform coefficient in coding/reconstruction order.

Figure 6:
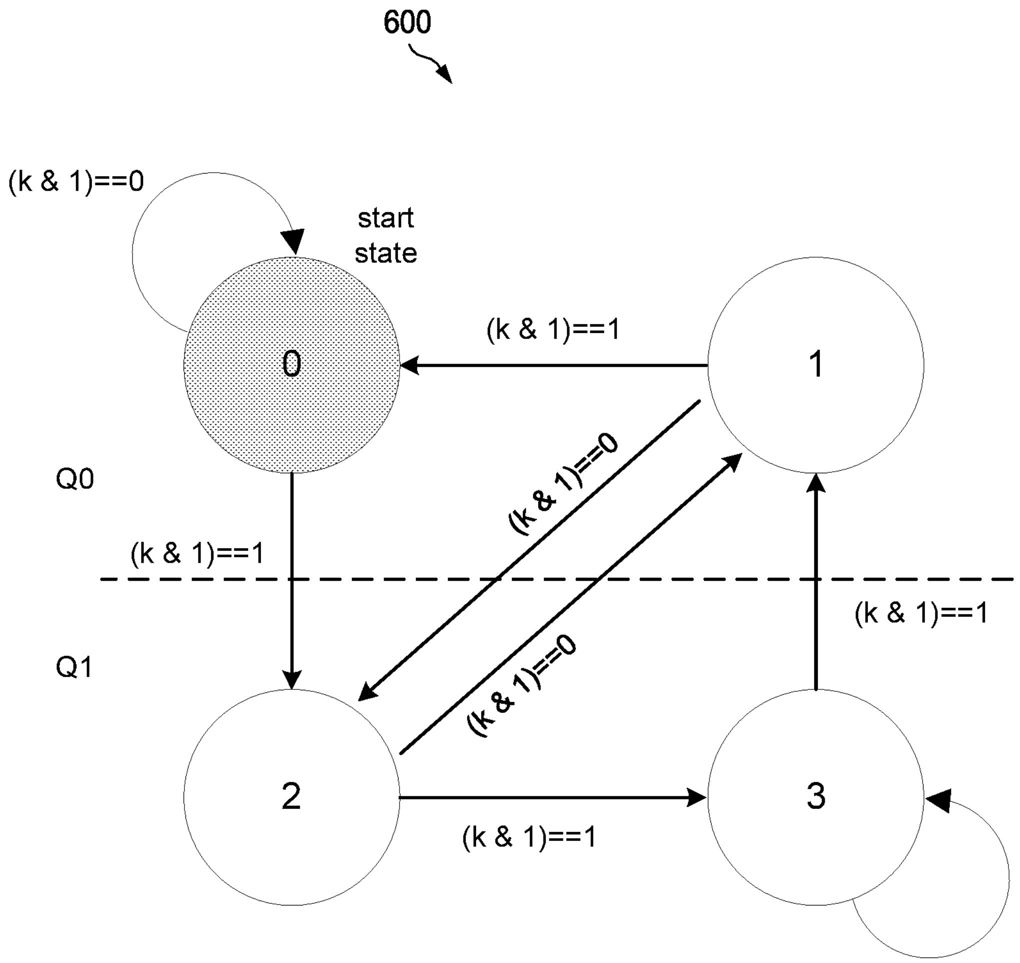
FIG. 6 is an illustration of an example of a state transition and quantizer selection for the proposed dependent quantization.

FIG. 6 is an illustration of an example of a state transition and quantizer selection for the proposed dependent quantization 600.

As illustrated in FIG. 6, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 6, where k denotes the value of the transform coefficient level.

Dependent quantization with 8 states is discussed in H. Schwarz, S. Schmidt, P. Haase, T. Nguyen, D. Marpe, and T. Wiegand, "Additional support of dependent quantization with 8 states," Joint Video Experts Team (WET), doc. JVET-Q0243, January 2020. JVET-Q0243.

It is proposed to additionally support dependent quantization with 8 states (i.e., 8-state DQ) for enabling encoders to further increase the coding efficiency. The version of dependent quantization used is indicated in the picture header or the picture parameter set. The decoding process is designed in a way that only the state transition table used depends on the selected variant of dependent quantization; all other aspects are the same for both versions of dependent quantization (4 states and 8 states). Alternatively, decoder implementations can also use a unified state transition table with 12 states, in which case only the initial state for a transform block depends on the variant of dependent quantization selected.

TABLE 2-1

State transition table for dependent quantization with 4 states

| QState | par = 0 | par = 1 |
|---|---|---|
| 0 | 0 | 1 |
| 1 | 2 | 3 |
| 2 | 1 | 0 |
| 3 | 3 | 2 |

TABLE 2-2

State transition table for dependent quantization with 8 states

| QState | par = 0 | par = 1 |
|---|---|---|
| 0 | 0 | 2 |
| 1 | 5 | 7 |
| 2 | 1 | 3 |
| 3 | 6 | 4 |
| 4 | 2 | 0 |
| 5 | 4 | 6 |
| 6 | 3 | 1 |
| 7 | 7 | 5 |

Intra mode coding with 67 intra prediction modes is discussed.

Figure 7:
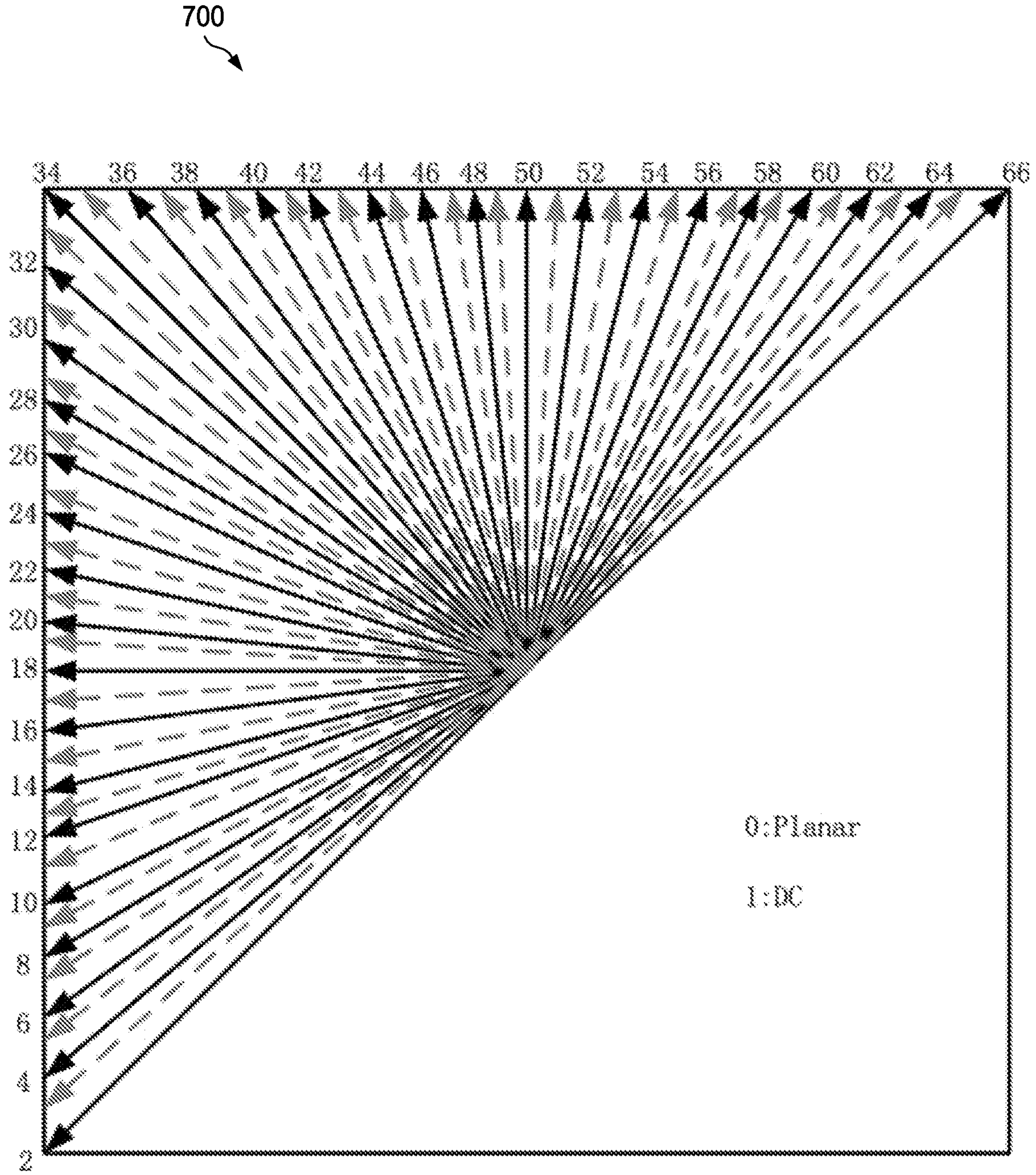
FIG. 7 is an example of the 67 intra prediction modes.

FIG. 7 is an example of the 67 intra prediction modes 700. To capture the arbitrary edge directions presented in natural video, the number of directional intra prediction modes is extended from 33, as used in HEVC, to 65. The additional directional modes are depicted as dotted arrows in FIG. 7, and the planar and direct current (DC) modes remain the same. These denser directional intra prediction modes apply for all block sizes and for both luma and chroma intra predictions.

Conventional angular intra prediction directions are defined from 45 degrees to −135 degrees moving in a clockwise direction as shown in FIG. 7. In the VVC test model (VTM), several conventional angular intra prediction modes are adaptively replaced with wide-angle intra prediction modes for the non-square blocks. The replaced modes are signaled using the original method and remapped to the indexes of wide angular modes after parsing. The total number of intra prediction modes 700 is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

Inter prediction is discussed.

For each inter-predicted CU, motion parameters include motion vectors, reference picture indices, a reference picture list usage index, and additional information needed for the new coding feature of VVC to be used for inter-predicted sample generation. The motion parameter can be signaled in an explicit or implicit manner. When a CU is coded with skip mode, the CU is associated with one prediction unit (PU) and has no significant residual coefficients, and no coded motion vector delta or reference picture index. A merge mode is specified whereby the motion parameters for the current CU are obtained from neighboring CUs, including spatial and temporal candidates, and additional schedules introduced in VVC. The merge mode can be applied to any inter-predicted CU, not only for skip mode. The alternative to merge mode is the explicit transmission of motion parameters, where the motion vector, corresponding reference picture index for each reference picture list, a reference picture list usage flag, and other needed information are signaled explicitly per each CU.

Intra block copy (IBC) is discussed.

IBC is a tool adopted in HEVC extensions on screen content coding (SCC). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with adaptive motion vector resolution (AMVR), the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs a rate distortion (RD) check for blocks with either width or height no larger than 16 luma samples. For non-merge mode, the block vector search is performed using hash-based search first. If the hash-based search does not return a valid candidate, block matching based local search will be performed.

In the hash-based search, hash key matching (32-bit cyclic redundancy check (CRC)) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signaled with a flag and it can be signaled as IBC advanced motion vector prediction (AMVP) mode or IBC skip/merge mode as follows:

IBC skip/merge mode: a merge candidate index is used to indicate which of the block vectors in the list from neighboring candidate IBC coded blocks is used to predict the current block. The merge list consists of spatial, history-based motion vector prediction (HMVP), and pairwise candidates.

IBC AMVP mode: block vector difference is coded in the same way as a motion vector difference. The block vector prediction method uses two candidates as predictors, one from a left neighbor and one from an above neighbor (if IBC coded). When either neighbor is not available, a default block vector will be used as a predictor. A flag is signaled to indicate the block vector predictor index.

Affine motion compensated prediction is discussed.

In HEVC, only a translation motion model is applied for motion compensation prediction (MCP). While in the real world, there are many kinds of motion, e.g., zoom in/out, rotation, perspective motions, and the other irregular motions. In Versatile Video Coding (VVC), a block-based affine transform motion compensation prediction is applied.

Figure 8:
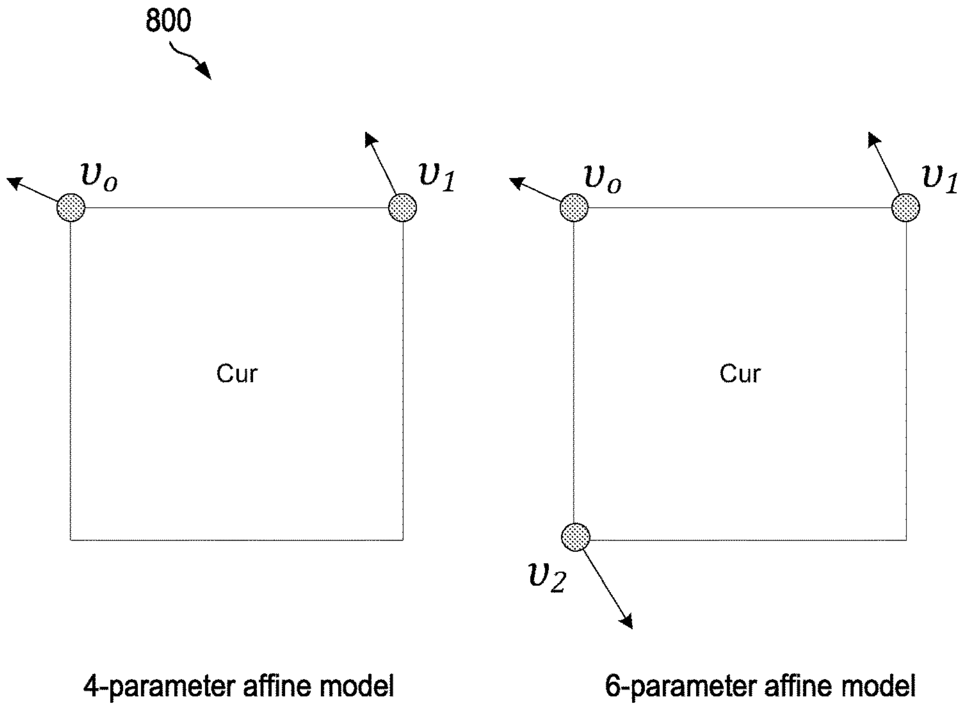
FIG. 8 illustrates control point based affine motion models.

FIG. 8 illustrates control point based affine motion models 800, including a 4-parameter affine motion model and a 6-parameter affine motion model. As shown in FIG. 8, the affine motion field of the block is described by motion information of two control point motion vectors (4-parameter) or three control point motion vectors (6-parameter).

For 4-parameter affine motion model, motion vector at sample location (x, y) in a block is derived as:

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \tag{2-4}$$

For 6-parameter affine motion model, motion vector at sample location (x, y) in a block is derived as:

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \tag{2-5}$$

Where ($mv_{0x}$, $mv_{0y}$) is motion vector of the top-left corner control point, ($mv_{1x}$, $mv_{1y}$) is motion vector of the top-right corner control point, and ($mv_{2x}$, $mv_{2y}$) is motion vector of the bottom-left corner control point.

Figure 9:
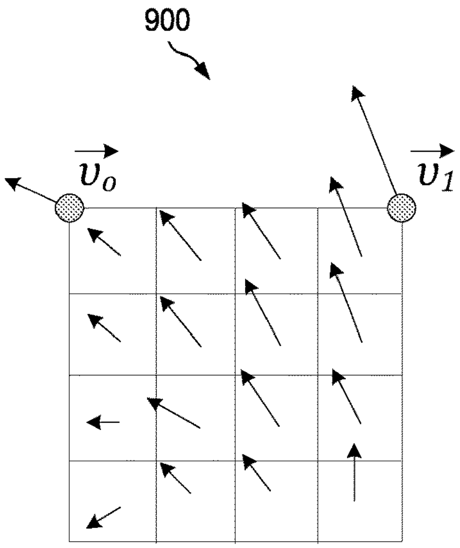
FIG. 9 shows an example of affine motion vector field (MVF) per subblock.

FIG. 9 shows an example of affine motion vector field (MVF) per subblock 900. In order to simplify the motion compensation prediction, block based affine transform prediction is applied. To derive a motion vector of each 4×4 luma subblock, the motion vector of the center sample of each subblock, as shown in FIG. 9, is calculated according to the above equations, and rounded to 1/16 fraction accuracy. Then, the motion compensation interpolation filters are applied to generate the prediction of each subblock with derived motion vector. The subblock size of chroma-components is also set to be 4×4. The MV of a 4×4 chroma subblock is calculated as the average of the motion vectors (MVs) of the four corresponding 4×4 luma subblocks.

As done for translational motion inter prediction, there are also two affine motion inter prediction modes: affine merge mode and affine AMVP mode.

Affine merge prediction is discussed.

Figure 10:
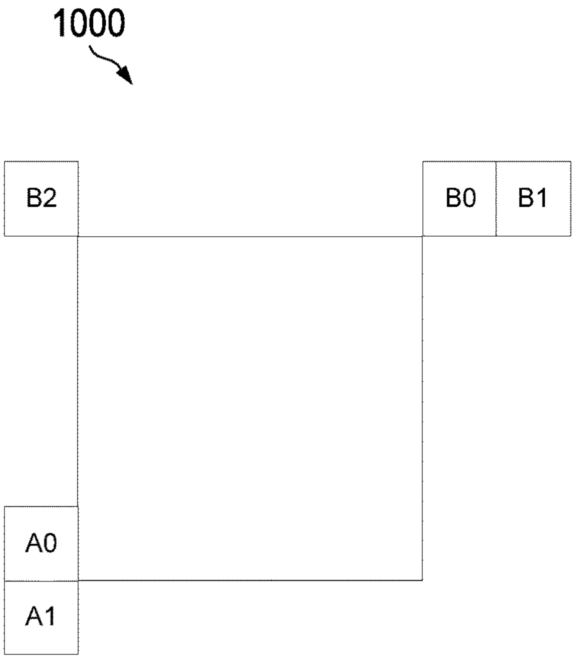
FIG. 10 illustrates example locations of inherited affine motion predictors.
Figure 11:
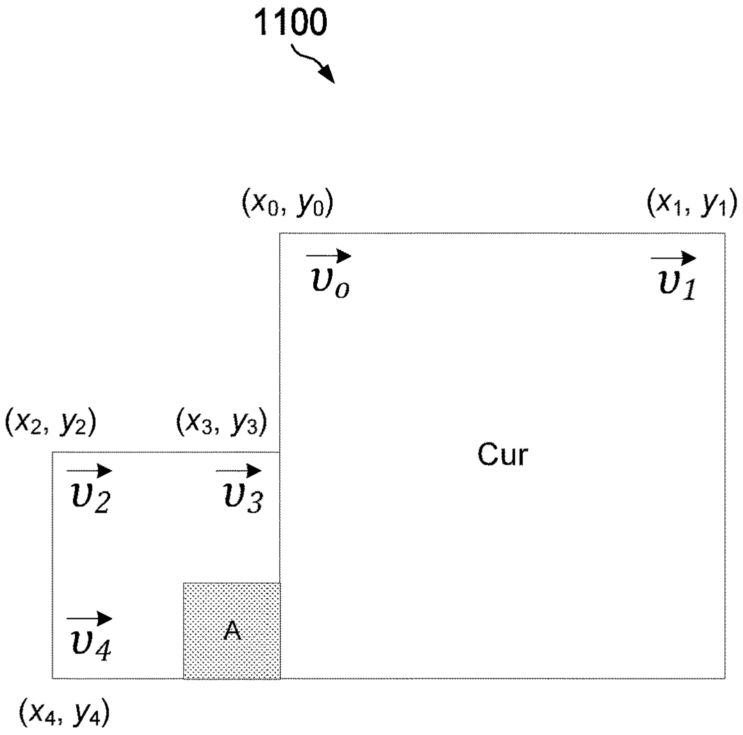
FIG. 11 illustrates the two scalar quantizers used in the proposed approach of dependent quantization.

Affine merge (AF_MERGE) mode can be applied to CUs with both width and height larger than or equal to 8. In this mode, the control point motion vectors (CPMVs) of the current CU are generated based on the motion information of the spatial neighboring CUs. There can be up to five CPMV prediction (CPMVP) candidates and an index is signaled to indicate the one to be used for the current CU. The following three types of CPMVs are used to form the affine merge candidate list:

- Inherited affine merge candidates that extrapolated from the CPMVs of the neighbor CUs
- Constructed affine merge CPMVP candidates that are derived using the translational MVs of the neighbor CUs
- Zero MVs FIG. 10 illustrates example locations of inherited affine motion predictors 1000. FIG. 11 illustrates the two scalar quantizers used in the proposed approach of dependent quantization 1100.

In VVC, there are a maximum of two inherited affine candidates, which are derived from affine motion models of the neighboring blocks, one from the left neighboring CUs and one from the above neighboring CUs. The candidate blocks are shown in FIG. 10. For the left predictor, the scan order is A0→A1, and for the above predictor, the scan order is B0→B1→B2. Only the first inherited candidate from each side is selected. No pruning check is performed between two inherited candidates. When a neighboring affine CU is identified, its control point motion vectors are used to derive the CPMVP candidate in the affine merge list of the current CU. As shown in FIG. 11, if the neighbor left bottom block A is coded in affine mode, the motion vectors $v_2$, $v_3$, and $v_4$ of the top left corner, above right corner and left bottom corner of the CU, which contains the block A, are attained. When block A is coded with 4-parameter affine motion model, the two CPMVs of the current CU are calculated according to $v_2$ and $v_3$. In the event that block A is coded with 6-parameter affine motion model, the three CPMVs of the current CU are calculated according to $v_2$, $v_3$, and $v_4$.

Figure 12:
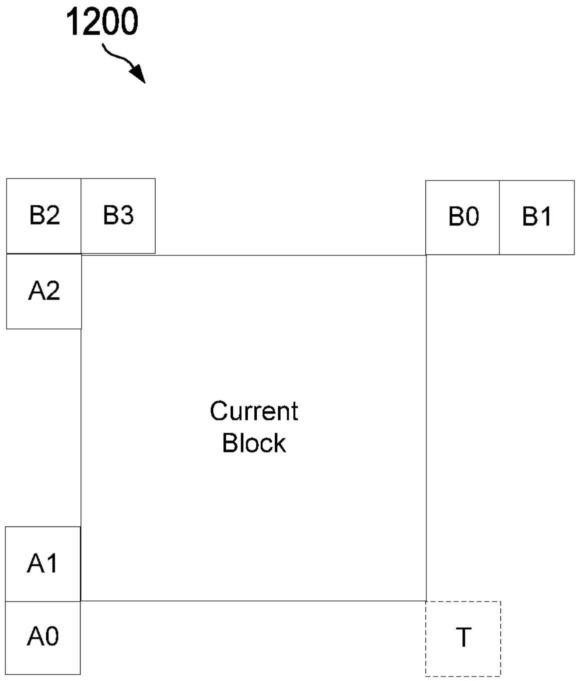
FIG. 12 illustrates example locations of a candidate position for constructed affine merge mode.

FIG. 12 illustrates example locations of a candidate position for constructed affine merge mode 1200. The constructed affine candidate indicates that the candidate is constructed by combining the neighbor translational motion information of each control point. The motion information for the control points is derived from the specified spatial neighbors and temporal neighbor shown in FIG. 12. $CPMV_k$ (k=1, 2, 3, 4) represents the k-th control point. For $CPMV_1$, the B2→B3→A2 blocks are checked and the MV of the first available block is used. For $CPMV_2$, the B1→B0 blocks are checked. For $CPMV_3$, the A1→A0 blocks are checked. For temporal motion vector prediction (TMVP), T is used as $CPMV_4$ if it's available.

After MVs of four control points are attained, affine merge candidates are constructed based on that motion information. The following combinations of control point MVs are used to construct in order:

$\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, $\{CPMV_1, CPMV_3\}$

The combination of three (3) CPMVs constructs a 6-parameter affine merge candidate and the combination of two (2) CPMVs constructs a 4-parameter affine merge candidate. To avoid a motion scaling process, if the reference indices of control points are different, the related combination of control point MVs is discarded.

After inherited affine merge candidates and constructed affine merge candidates are checked, if the list is still not full, zero MVs are inserted to the end of the list.

Affine AMVP prediction is discussed.

Affine AMVP mode can be applied for CUs with both width and height larger than or equal to 16. An affine flag in CU level is signaled in the bitstream to indicate whether affine AMVP mode is used and then another flag is signaled to indicate whether 4-parameter affine motion model or 6-parameter affine motion model is used. In this mode, the difference of the CPMVs of current CUs and their predictors CPMVPs is signaled in the bitstream. The affine AMVP candidate list size is 2 and it is generated by using the following four types of CPMV candidates in order:

- Inherited affine AMVP candidates that extrapolated from the CPMVs of the neighbor CUs
- Constructed affine AMVP candidates CPMVPs that are derived using the translational MVs of the neighbor CUs
- Translational MVs from neighboring CUs
- Zero MVs The checking order of inherited affine AMVP candidates is similar to the checking order of inherited affine merge candidates. The only difference is that, for an AMVP candidate, only the affine CU that has the same reference picture as found in the current block is considered. No pruning process is applied when inserting an inherited affine motion predictor into the candidate list.

Constructed AMVP candidates are derived from the specified spatial neighbors shown in FIG. 12. The same checking order is used as done in affine merge candidate construction. In addition, a reference picture index of the neighboring block is also checked. The first block in the checking order that is inter coded and has the same reference picture as found in the current CU is used. When the current CU is coded with 4-parameter affine motion model, and $mv_0$ and $mv_1$ are both available, they are added as one candidate in the affine AMVP list. When the current CU is coded with 6-parameter affine motion model, and all three CPMVs are available, they are added as one candidate in the affine AMVP list. Otherwise, constructed AMVP candidate is set as unavailable.

If affine AMVP list candidates are still less than 2 after inherited affine AMVP candidates and constructed AMVP candidates are checked, $mv_0$, $mv_1$, and $mv_2$ will be added, in order, as the translational MVs to predict all control point MVs of the current CU, when available. Finally, zero MVs are used to fill the affine AMVP list if it is still not full.

Affine motion information storage is discussed.

In VVC, the CPMVs of affine CUs are stored in a separate buffer. The stored CPMVs are only used to generate the inherited CPMVPs in affine merge mode and affine AMVP mode for the lately coded CUs. The subblock MVs derived from CPMVs are used for motion compensation, MV derivation of merge/AMVP list of translational MVs and deblocking.

Figure 13:
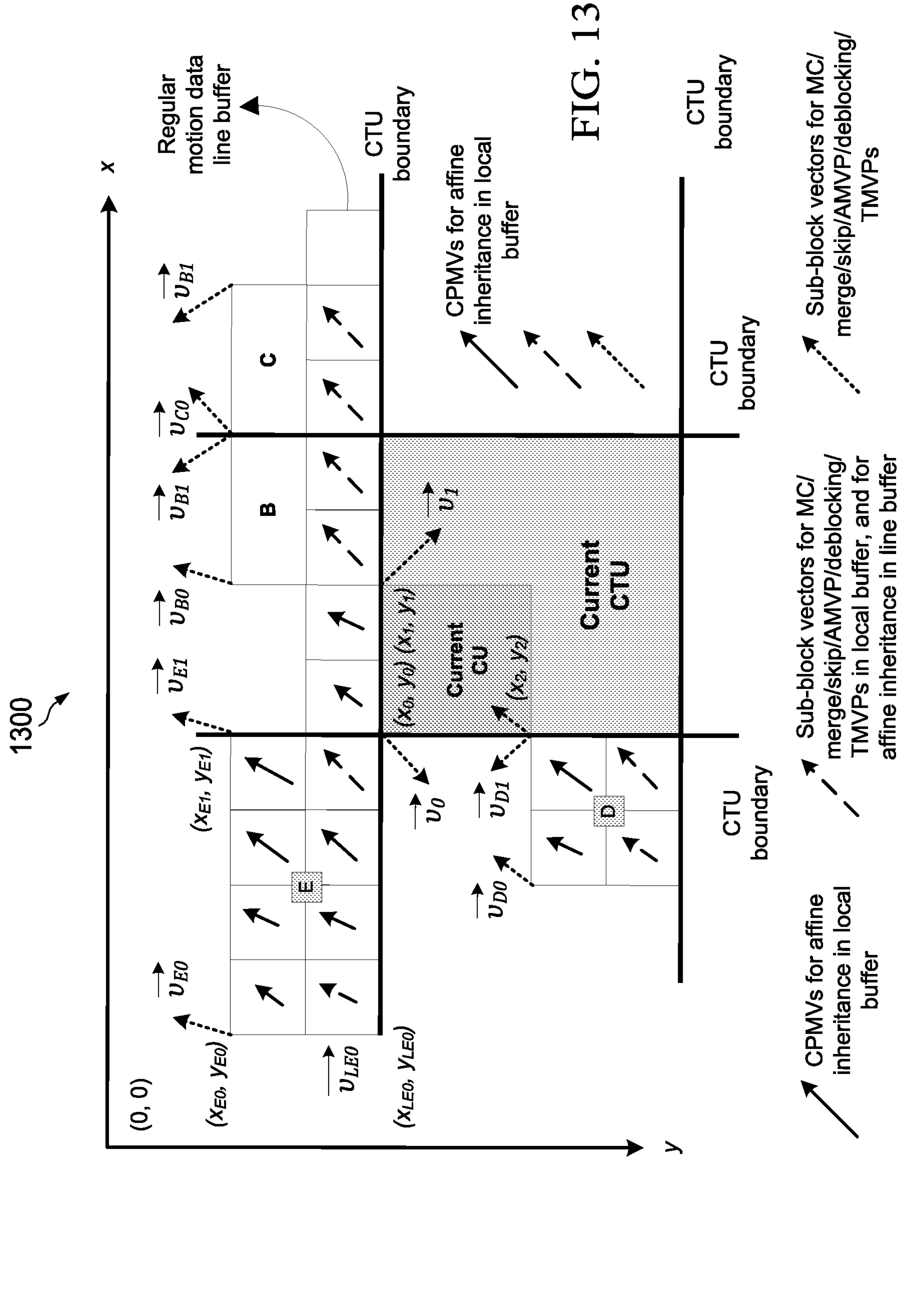
FIG. 13 is an illustration of motion vector usage for a proposed combined method.

To avoid the picture line buffer for the additional CPMVs, affine motion data inheritance from the CUs from the above CTU is treated differently to the inheritance from the normal neighboring CUs. If the candidate CU for affine motion data inheritance is in the above CTU line, the bottom-left and bottom-right subblock MVs in the line buffer instead of the CPMVs are used for the affine MVP derivation. In this way, the CPMVs are only stored in a local buffer. If the candidate CU is 6-parameter affine coded, the affine model is degraded to a 4-parameter model. FIG. 13 is an illustration of motion vector usage for a proposed combined method 1300. As shown in FIG. 13, along the top CTU boundary, the bottom-left and bottom right subblock (or sub-block) motion vectors of a CU are used for affine inheritance of the CUs in bottom CTUs.

Prediction refinement with optical flow for affine mode is discussed.

Subblock based affine motion compensation can save memory access bandwidth and reduce computation complexity, compared to pixel-based motion compensation, at the cost of a prediction accuracy penalty. To achieve a finer granularity of motion compensation, prediction refinement with optical flow (PROF) is used to refine the subblock based affine motion compensated prediction without increasing the memory access bandwidth for motion compensation. In VVC, after the subblock based affine motion compensation is performed, a luma prediction sample is refined by adding a difference derived by the optical flow equation. The PROF is described in the following four steps.

Step 1) The subblock-based affine motion compensation is performed to generate subblock prediction I(i, j).

Step 2) The spatial gradients $g_x(i, j)$ and $g_y(i, j)$ of the subblock prediction are calculated at each sample location using a 3-tap filter [−1, 0, 1]. The gradient calculation is exactly the same as gradient calculation in bi-directional optical flow (BDOF).

$$g_x(i,j)=(I(i+1,j)\gg \text{shift1})-(I(i-1,j)\gg \text{shift1}) \quad (2\text{-}6)$$

$$g_y(i,j)=(I(i,j+1)\gg \text{shift1})-(I(i,j-1)\gg \text{shift1}) \quad (2\text{-}7)$$

shift1 is used to control the gradient's precision. The subblock (i.e. 4×4) prediction is extended by one sample on each side for the gradient calculation. To avoid additional memory bandwidth and additional interpolation computation, those extended samples on the extended borders are copied from the nearest integer pixel position in the reference picture.

Figure 14:
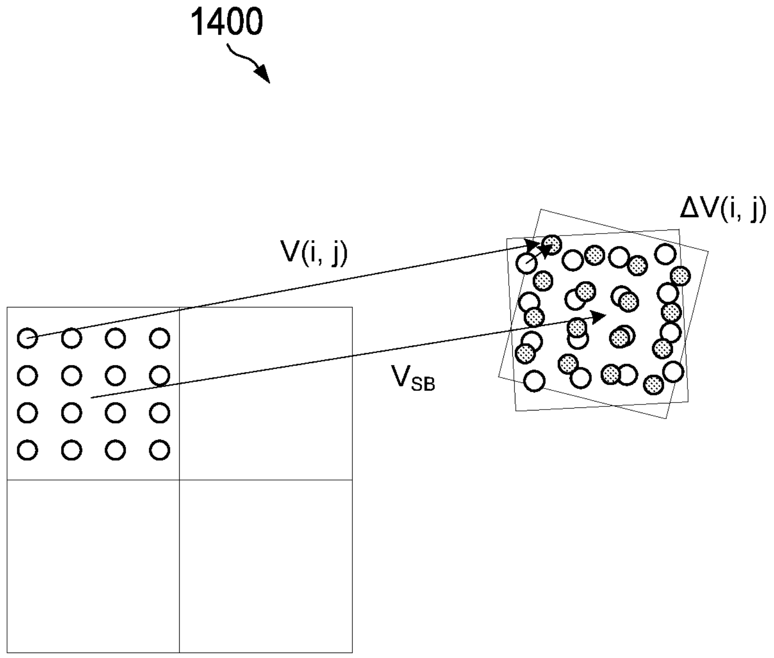
FIG. 14 illustrates an example of Subblock MV $V_{SB}$ and pixel $\Delta v(i, j)$.

Step 3) The luma prediction refinement is calculated by the following optical flow equation.

$$\Delta I(i,j)=g_x(i,j)*\Delta v_x(i,j)+g_y(i,j)*\Delta v_y(i,j) \quad (2\text{-}8)$$

where the Δv(i, j) is the difference between sample MV computed for sample location (i, j), denoted by v(i, j), and the subblock MV of the subblock to which sample location (i, j) belongs, as shown in FIG. 14. FIG. 14 illustrates an example of Subblock MV $V_{SB}$ and pixel Δv(i, j) (smallest arrow) 1400. The Δv(i, j) is quantized in the unit of 1/32 luma sample precision.

Since the affine model parameters and the sample location relative to the subblock center are not changed from subblock to subblock, Δv(i, j) can be calculated for the first subblock, and reused for other subblocks in the same CU. Let dx(i, j) and dy(i, j) be the horizontal and vertical offset from the sample location (i, j) to the center of the subblock ($x_{SB}$, $y_{SB}$), Δv(x, y) can be derived by the following equation.

$$\begin{cases} dx(i, j) = i - x_{SB} \\ dy(i, j) = j - y_{SB} \end{cases} \quad (3\text{-}9)$$

$$\begin{cases} \Delta v_x(i, j) = C * dx(i, j) + D * dy(i, j) \\ \Delta v_y(i, j) = E * dx(i, j) + F * dy(i, j) \end{cases} \quad (3\text{-}10)$$

In order to keep accuracy, the center of the subblock ($x_{SB}$, $y_{SB}$) is calculated as (($W_{SB}$−1)/2, ($H_{SB}$−1)/2), where $W_{SB}$ and $H_{SB}$ are the subblock width and height, respectively.

For 4-parameter affine motion model, $$\begin{cases} C = F = \dfrac{v_{1x} - v_{0x}}{w} \\ E = -D = \dfrac{v_{1y} - v_{0y}}{w} \end{cases} \quad (3\text{-}11)$$

For 6-parameter affine motion model, $$\begin{cases} C = \dfrac{v_{1x} - v_{0x}}{w} \\ D = \dfrac{v_{2x} - v_{0x}}{h} \\ E = \dfrac{v_{1y} - v_{0y}}{w} \\ F = \dfrac{v_{2y} - v_{0y}}{h} \end{cases} \quad (3\text{-}12)$$

where ($v_{0x}$, $v_{0y}$), ($v_{1x}$, $v_{1y}$), ($v_{2x}$, $v_{2y}$) are the top-left, top-right and bottom-left control point motion vectors, and w and h are the width and height of the CU.

Step 4) Finally, the luma prediction refinement ΔI(i, j) is added to the subblock prediction I(i, j). The final prediction I' is generated as the following equation.

$$I'(i,j)=I(i,j)+\Delta I(i,j) \quad (3\text{-}1)$$

PROF is not to be applied in two cases for an affine coded CU: 1) all control point MVs are the same, which indicates the CU only has translational motion; and 2) the affine motion parameters are greater than a specified limit because the subblock based affine MC is degraded to CU based MC to avoid large memory access bandwidth requirement.

A fast encoding method is applied to reduce the encoding complexity of affine motion estimation with PROF. PROF is not applied at the affine motion estimation stage in the following two situations: a) if this CU is not the root block and its parent block does not select the affine mode as its best mode, PROF is not applied since the possibility for the current CU to select the affine mode as best mode is low; and b) if the magnitude of four affine parameters (C, D, E, F) are all smaller than a predefined threshold and the current picture is not a low delay picture, PROF is not applied because the improvements introduced by PROF is small in this case. In this way, the affine motion estimation with PROF can be accelerated.

Unfortunately, the current design of dependent quantization has the following problems or drawbacks. It is noticed that for certain residual characteristics, using 4-state DQ may bring higher coding performance compared to 8-state DQ. However, in the current design of dependent quantization, a constant number of states is used within a sequence, which is less efficient and less flexible.

Disclosed herein are techniques that permit different dependent quantization (DQ) parameters to be applied to different video units within a sequence. The techniques also permit quantization parameters to be changed within a video unit. That is, an adaptive dependent quantization selection with multiple choices (e.g., different number of states or different context modeling/entropy coding method) is proposed for image/video coding wherein more than one way of DQ implementation is allowed. Because of this, coding efficiency and flexibility is improved.

In this disclosure, the term DQ represents a coding tool in which the set of admissible reconstruction values for a transform coefficient depends on the values of the transform coefficient levels that precede the current transform coefficient level in reconstruction order. The present disclosure is not limited to the dependent quantization technology described in VVC.

In the following discussion, multiple numbers of DQ states are used as an example to describe how the adaptive DQ selection is applied. However, the number of states may be replaced by other choices (e.g., context modeling method or entropy coding method) in some embodiments.

A discussion of the dependent quantization and other coding tools is provided.

Example 1

1. During the process of dependent quantization, different choices of DQ may be applied to different video units (e.g., different numbers of states may be used for state transition) within a sequence. Video units may be considered to be within the same sequence when, for example, the video units refer to the same sequence parameter set. The different choices may be referred to as a DQ parameter. The DQ parameter may be, for example, a number of states, a set of states, a coding method, a coding tool, and so on. The DQ parameter may be selected from a set of available DQ parameters (e.g., DQ parameters available to be selected).

a. In one example, the video unit may refer to color component/sub-picture/slice/tile/coding tree unit (CTU)/CTU row/groups of CTU/coding unit (CU)/prediction unit (PU)/transform unit (TU)/coding tree block (CTB)/coding block (CB)/prediction block (PB)/transform block (TB)/any other region that contains more than one sample or pixel.

A color component is, for example, one of Y, Cb, or Cr from a YCbCr color space or is one of R, G, B in an RGB color space, where Y is a luma component, Cb is a blue chroma component, Cr is a red chroma component, R is a red color component, G is a green color component, and B is a blue color component.

A sub-picture is a rectangular region of one or more slices within a picture. A slice is an integer number of complete tiles or an integer number of consecutive complete CTU rows within a tile of a picture that are exclusively contained in a single network abstraction layer (NAL) unit. A tile is a rectangular region of CTUs within a particular tile column and a particular tile row in a picture. A coding tree unit (CTU) is a CTB of luma samples, two corresponding CTBs of chroma samples of a picture that has three sample arrays, or a CTB of samples of a monochrome picture, and syntax structures used to code the samples.

A coding unit (CU) is a coding block of luma samples, two corresponding coding blocks of chroma samples of a picture that has three sample arrays in the single tree mode, or a coding block of luma samples of a picture that has three sample arrays in the dual tree mode, or two coding blocks of chroma samples of a picture that has three sample arrays in the dual tree mode, or a coding block of samples of a monochrome picture, and syntax structures used to code the samples. A prediction unit (PU) of a CU may comprise a prediction block of luma samples, two corresponding prediction blocks of chroma samples, and syntax structures used to predict the prediction blocks. A transform unit (TU) is a transform block of luma samples and two corresponding transform blocks of chroma samples of a picture when using a single coding unit tree for luma and chroma; or, a transform block of luma samples or two transform blocks of chroma samples when using two separate coding unit trees for luma and chroma, and syntax structures used to transform the transform block samples.

A coding tree block (CTB) is an M×N block of samples for some values of M and N such that the division of a component into CTBs is a partitioning. A coding block is an M×N block of samples for some values of M and N such that the division of a CTB into coding blocks is a partitioning. A prediction block is a rectangular (i.e., square or non-square) block of samples on which the same prediction is applied. A transform block is a rectangular M×N block of samples resulting from a transform in the decoding process.

A pixel, pel, or picture element is the smallest portion of an image or display that a computer is capable of printing or displaying. A pixel may also be referred to as a sample.

b. In one example, the number of states (denoted by N) used in the multiple-choice dependent quantization may be an integer being larger than 0.

i. In one example, N may be a power of 2 (i.e., $2^k$) where k is equal to 2/3/4/5/6/7, etc.

c. In one example, M choices of DQ may be allowed for a video unit wherein M is an integer value greater than 1.

i. In one example, a set having M choices may be applied to a video unit, wherein M may be pre-defined, signaled, or derived on-the-fly.

1) In one example, M is equal to 2 and the set may be {4-state DQ, 8-state DQ}, or {4-state DQ, 16-state DQ}, or {8-state DQ, 16-state DQ}.

2) In one example, M is equal to 3 and the set may be {4-state DQ, 8-state DQ, 16-state DQ}.

3) In one example, M and/or elements in the set may be signaled at sequence level/picture, level/slice, and level/tile group level, such as in sequence header/picture header/SPS/VPS/DPS/DCI/PPS/APS/slice header/tile group header.

4) In one example, different sets (wherein at least one of a first set is different from one of a second set) may be used for different video units.

a) Alternatively, the indication of using which set may be signaled at sequence level/group of pictures, level/picture, level/slice, and level/tile group level.

d. In one example, a first set of allowed numbers of states in dependent quantization may be used for a first color component, and a second set of allowed numbers of states may be used for a second color component.

i. Alternatively, a first number of states in dependent quantization may be used for a first color component, and a second number of states may be used for a second color component.

ii. In one example, indications of different numbers of states or different sets used in which component may be signaled.

iii. In one example, the first color component may be Y in the YCbCr format, or G in the RGB format.

iv. In one example, the first color component may be Cb in the YCbCr format, or B in the RGB format.

v. In one example, the first color component may be Cr in the YCbCr format, or R in the RGB format.

vi. In one example, the second color component may be Y in the YCbCr format, or G in the RGB format.

vii. In one example, the second color component may be Cb in the YCbCr format, or B in the RGB format.

viii. In one example, the second color component may be Cr in the YCbCr format, or R in the RGB format.

e. In one example, the number of states or the set of allowed numbers of states in dependent quantization are used in a video unit may depend on coded information.

i. In one example, the number of states or the set of allowed numbers of states used in dependent quantization may depend on profile, and/or level, and/or tier, and/or layers.

Profiles, tiers, and levels specify restrictions on bitstreams and hence limits on the capabilities needed to decode the bitstreams. Profiles, tiers, and levels may also be used to indicate interoperability points between individual decoder implementations. A profile is a defined set of coding tools used to create a compliant or conforming bitstream. Each profile specifies a subset of algorithmic features and limits that shall be supported by all decoders conforming to that profile.

A level is a set of constraints for a bitstream (e.g., max luma sample rate, max bit rate for a resolution, etc.). That is, a level is a set of constraints that indicate the required decoder performance to playback a bitstream of the specified profile.

The levels are split into two tiers: Main and High. The Main tier is a lower tier than the High tier. The tiers were made to deal with applications that differ in terms of their maximum bit rate. The Main tier was designed for most applications while the High tier was designed for very demanding applications.

Each level of a tier specifies a set of limits on the values that may be taken by the syntax elements of a particular standard (e.g., HEVC, VVC). The same set of tier and level definitions is used with all profiles, but individual implementations may support a different tier and, within a tier, a different level for each supported profile. For any given profile, a level of a tier generally corresponds to a particular decoder processing load and memory capability.

ii. In one example, the number of states or the set of allowed numbers of states used in dependent quantization may depend on picture/slice type.

1) In one example, a first number of states or a first set of allowed numbers of states in dependent quantization are used for I slice.

2) Alternatively, a second number of states or a second set of allowed numbers of states in dependent quantization are used for P/B slice.

iii. In one example, the number of states or the set of allowed numbers of states used in dependent quantization may depend on temporal layer id. A temporal layer id (a.k.a., a temporal layer identifier (ID)) is a value used to identify a layer in multi-layer coding. For example, the temporal layer ID may be 0 for the base layer, 1 for the first enhancement layer, 2 for the second enhancement layer, and so on.

1) In one example, different numbers of states or different sets of allowed numbers of states in dependent quantization may be used depending on whether the temporal layer id is less than T, such as T=1.

2) Alternatively, different numbers of states or different sets of allowed numbers of states in dependent quantization may be used depending on whether the temporal layer id is larger than T, such as T=2.

iv. In one example, the number of states or the set of allowed numbers of states in dependent quantization may depend on the prediction modes in the video units.

1) For example, the prediction modes may refer to MODE_INTRA, MODE_INTER, MODE_IBC, MODE_PLT, and etc. MODE_INTRA signifies intra prediction, MODE_INTER signifies inter prediction, MODE_IBC signifies intra block copy, and MODE_PLT signifies palette mode.

v. In one example, the number of states or the set of allowed numbers of states used in dependent quantization may depend on whether the video unit is coded with transform skip.

1) In one example, a first number of states or a first set of allowed numbers of states in dependent quantization are used for transform skip coded video units.

2) Alternatively, a second number of states or a second set of allowed numbers of states in dependent quantization are used for those video units coded without transform skip.

vi. In one example, the number of states or the set of allowed numbers of states used in dependent quantization may depend on whether the video unit is coded with regular residual coding (a.k.a., RRC) or transform skip residual coding (a.k.a., TSRC). RRC and TSRC are different types of coding supported by VVC. RRC can achieve more compression gain than TSRC in the case of lossless compression of natural video sequences. However, the situation is opposite in the case of lossy compression, where TSRC can achieve more compression than RRC.

1) In one example, a first number of states or a first set of allowed numbers of states in dependent quantization are used for RRC coded video units.

2) Alternatively, a second number of states or a second set of allowed numbers of states in dependent quantization are used for TSRC coded video units.

vii. In one example, the number of states or the set of allowed numbers of states in dependent quantization may depend on whether one or more coding tools are applied or not.

1) In one example, the coding tool may refer to matrix-based intra-prediction (MIP), multiple reference line (MRL), inter frame stripe prediction (ISP), decoder-side intra mode derivation (DIMD), MTS, Low Frequency Non-Separable Transform (LFNST), subblock transform (SBT), geometric partition (GEO), combined inter- and intra-prediction (CIIP), merge mode with motion vector difference (MMVD), Subblock-based Temporal Motion Vector Prediction (SbTMVP), overlapped block motion compensation (OBMC), Frame Rate Up-Conversion (FRUC), IBC, Sign Prediction, Sign hiding, or Adaptive scanning ordering.

viii. In one example, the number of states or the set of allowed numbers of states used in dependent quantization for a video unit may depend on the size or/and dimensions of the video unit.

ix. In one example, the number of states or the set of allowed numbers of states used in dependent quantization for a video unit may depend on the information of block partitioning.

Example 2

2. When the numbers of states or the set of allowed numbers of states in dependent quantization are allowed to be changed in a video unit, the indication of the number of states or the set of allowed numbers of states used in dependent quantization may be signaled as a syntax element.

a. In one example, the syntax element may be signaled at the same level as the video unit.

i. For example, when the video unit refers to TU/TB, the syntax element may be signaled at the TU/TB level. When the video unit refers to CU/CB, the syntax element may be signaled at the CU/CB level.

b. Alternatively, the syntax element may be signaled at a different level from the video unit.

i. In one example, when the video unit refers to CU/TU, the syntax element may be signaled at the CTU level, in which the number of states used in dependent quantization for all CUs/TUs in the CTU is indicated by the syntax element.

c. In one example, the syntax element may be conditionally signaled.

i. In one example, whether to signal the syntax element or how to signal it may depend on coded information of current block and/or neighboring blocks (adjacent or non-adjacent).

1). In one example, the coded information may include the block dimension, prediction mode, transform mode, residual coding mode, CBF values, position of non-zero coefficients, and position of last non-zero coefficient.

ii. In one example, the number of states may not be signaled if the CBF value is equal to 0.

iii. In one example, the number of states may not be signaled if there is only a DC coefficient.

d. In one example, the syntax element may be binarized with fixed length coding, truncated unary coding, unary coding, EG coding, or a flag. Fixed-length coding uses a same number of bits for each codeword. Unary coding is an entropy encoding that represents a natural number, n, with n ones followed by a zero. Truncated unary code is a variant of unary code. A flag is a variable or single-bit syntax element that can take one of the two possible values: 0 and 1.

e. In one example, the syntax element may be bypass coded. In contrast to the regular encoding mode, bypass coding omits the computationally expensive context estimation and probability update stages because bypass coding mode assumes a fixed probability distribution for the input bins.

f. Alternatively, the syntax element may be context coded. For example, the syntax element may be context coded using Context-Adaptive Binary Arithmetic Coding (CABAC).

i. The context may depend on coded information, such as dimensions of the video unit, and/or slice/picture type, and/or information from neighboring video units.

ii. Alternatively, the context may not depend on coded information.

Example 3

3. When numbers of states or the set of allowed numbers of states in dependent quantization are allowed to be changed in a video unit, the number of states or the set of allowed numbers of states used in dependent quantization may be derived using coded information without being signaled. Suppose $N_1$ and $N_2$ are two different number of states ($N_1$-state DQ and $N_2$-state DQ) in dependent quantization that can be used in a video unit.

a. In one example, the derivation of the number of states used in dependent quantization may depend on the size and/or dimensions of the video unit. Denote the width and height of the video unit as W and H.

i. In one example, $N_1$-state DQ may be used in the video unit when W*H is less than $T_1$, and $N_2$-state DQ may be used in the video unit when W*H is larger than or equal to $T_1$.

ii. In one example, $N_1$-state DQ may be used in the video unit when W/H (or H/W) is less than $T_2$, and $N_2$-state DQ may be used in the video unit when W/H (or H/W) is larger than or equal to $T_2$.

b. In one example, the derivation of the number of states used in dependent quantization may depend on the number of coefficients in the video unit.

i. In one example, $N_1$-state DQ may be used in the video unit when the number of coefficients is less than $T_1$, and $N_2$-state DQ may be used in the video unit when the number of coefficients is larger than or equal to $T_1$.

c. In one example, the derivation of the number of states used in dependent quantization may depend on the last scan position (denoted by lastScanPos) or the syntax elements indicating the last scan position (e.g., last_sig_coeff_x_prefix/last_sig_coeff_y_prefix/last_sig_coeff_x_suffix/last_sig_coeff_y_suffix in VVC) in the video unit.

i. In one example, $N_1$-state DQ may be used in the video unit when lastScanPos is less than $T_1$, and $N_2$-state DQ may be used in the video unit when lastScanPos is larger than or equal to $T_1$.

d. In one example, the derivation of the number of states used in dependent quantization may depend on the color component.

i. In one example, $N_1$-state DQ may be used in the Y component, and $N_2$-state DQ may be used in the Cb/Cr component in YCbCr color format.

e. In one example, the derivation of the number of states used in dependent quantization may depend on prediction modes applied to the current block.

i. For example, the prediction modes may refer to MODE_INTRA, MODE_INTER, MODE_IBC, MODE_PLT, etc.

f. In one example, the derivation of the number of states used in dependent quantization may depend on transform modes applied to the current block.

i. For example, the transform modes may refer to transform skip, non-transform-skip, explicit MTS, implicit MTS, different MTS types, and etc.

g. In one example, the derivation of the number of states used in dependent quantization may depend on residual coding methods applied to the current block.

i. For example, the transform modes may refer to regular residual coding (a.k.a., RRC), transform skip based residual coding (a.k.a. TSRC), etc.

h. In one example, the derivation of the number of states used in dependent quantization may depend on whether one or more coding tools are applied.

i. In one example, the coding tool may refer to MIP/MRL/ISP/DIMD/MTS/LFNST/SBT/GEO/CIIP/MMVD/SbTMVP/OBMC/FRUC/IBC/Sign Prediction/Sign hiding/Adaptive scanning ordering.

i. In one example, the derivation of the number of states used in dependent quantization may depend on the decoded information (e.g., number of states, residual information, reconstructed samples) of neighboring blocks (adjacent or non-adjacent).

Whether to and/or how to apply the disclosed methods above may be signaled at sequence level/picture, level/slice, and level/tile group level, such as in sequence header/picture header/SPS/VPS/DPS/DCI/PPS/APS/slice header/tile group header.

Whether to and/or how to apply the disclosed methods above may be dependent on coded information, such as color format and single/dual tree partitioning.

Figure 15:
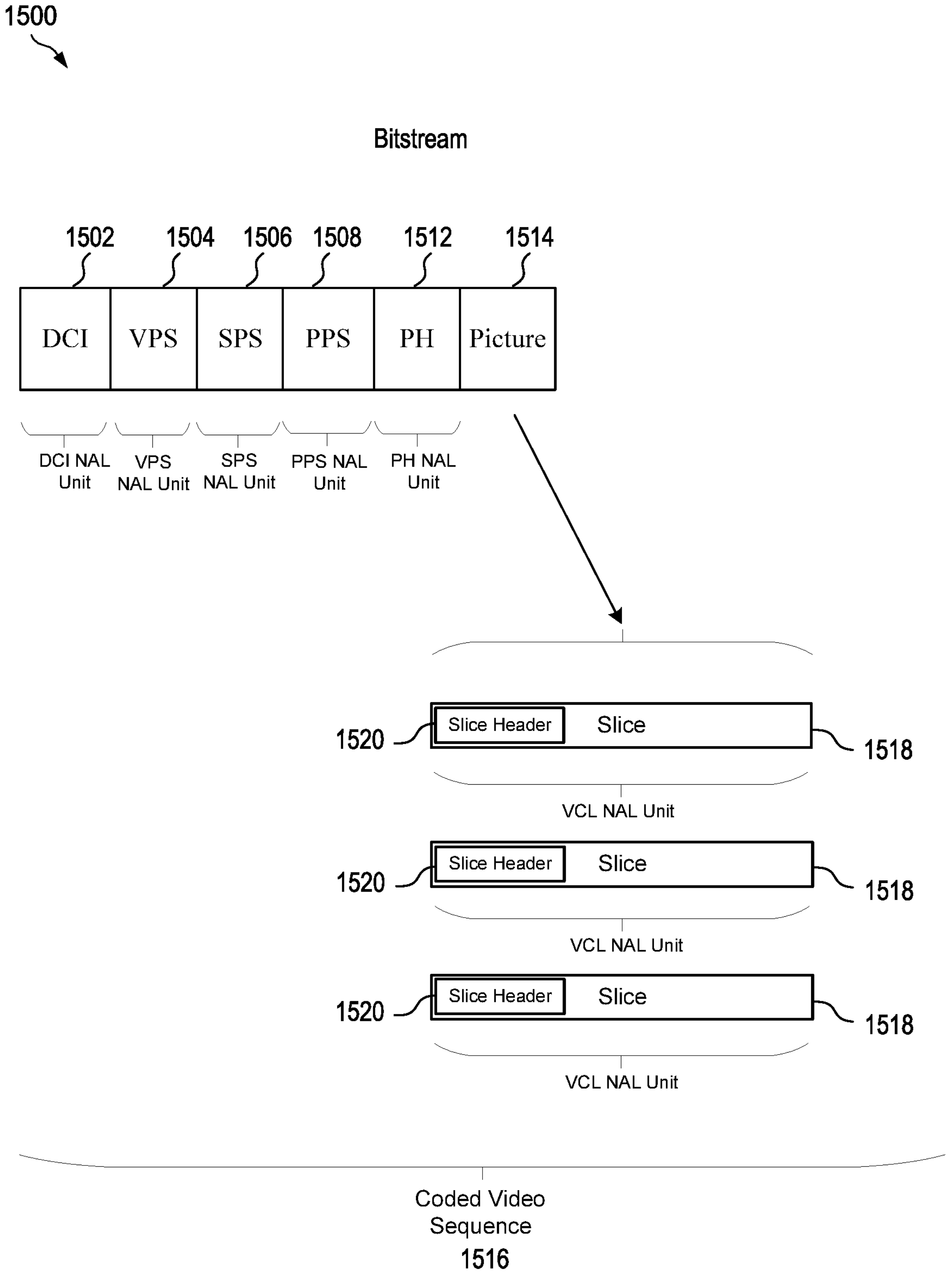
FIG. 15 illustrates an embodiment of a video bitstream.

FIG. 15 illustrates an embodiment of a video bitstream 1500. As used herein the video bitstream 1500 may also be referred to as a coded video bitstream, a bitstream, or variations thereof. As shown in FIG. 15, the bitstream 1500 comprises one or more of the following: decoding capability information (DCI) 1502, a video parameter set (VPS) 1504, a sequence parameter set (SPS) 1506, a picture parameter set (PPS) 1508, a picture header (PH) 1512, and a picture 1514. Each of the DCI 1502, the VPS 1504, the SPS 1506, and the PPS 1508 may be generically referred to as a parameter set. In an embodiment, other parameter sets not shown in FIG. 15 may also be included in the bitstream 1500 such as, for example, an adaption parameter set (APS), which is a syntax structure containing syntax elements that apply to zero or more slices as determined by zero or more syntax elements found in slice headers.

The DCI 1502, which may also be referred to a decoding parameter set (DPS) or decoder parameter set, is a syntax structure containing syntax elements that apply to the entire bitstream. The DCI 1502 includes parameters that stay constant for the lifetime of the video bitstream (e.g., bitstream 1500), which can translate to the lifetime of a session. The DCI 1502 can include profile, level, and sub-profile information to determine a maximum complexity interop point that is guaranteed to be never exceeded, even if splicing of video sequences occurs within a session. It further optionally includes constraint flags, which indicate that the video bitstream will be constrained of the use of certain features as indicated by the values of those flags. With this, a bitstream can be labelled as not using certain tools, which allows among other things for resource allocation in a decoder implementation Like all parameter sets, the DCI 1502 is present when first referenced, and referenced by the very first picture in a video sequence, implying that it has to be sent among the first network abstraction layer (NAL) units in the bitstream. While multiple DCIs 1502 can be in the bitstream 1500, the value of the syntax elements therein cannot be inconsistent when being referenced.

The VPS 1504 includes decoding dependency or information for reference picture set construction of enhancement layers. The VPS 1504 provides an overall perspective or view of a scalable sequence, including what types of operation points are provided, the profile, tier, and level of the operation points, and some other high-level properties of the bitstream that can be used as the basis for session negotiation and content selection, etc.

In an embodiment, when it is indicated that some of the layers use inter layer prediction (ILP), the VPS 1504 indicates that a total number of output layer sets (OLSs) specified by the VPS is equal to the number of layers, indicates that the i-th OLS includes the layers with layer indices from 0 to i, inclusive, and indicates that for each OLS only the highest layer in the OLS is output.

The SPS 1506 contains data that is common to all the pictures in a sequence of pictures (SOP). The SPS 1506 is a syntax structure containing syntax elements that apply to zero or more entire coded layer video sequences (CLVSs) as determined by the content of a syntax element found in the PPS 1508 referred to by a syntax element found in each picture header 1512. In contrast, the PPS 1508 contains data that is common to the entire picture 1514. The PPS 1508 is a syntax structure containing syntax elements that apply to zero or more entire coded pictures as determined by a syntax element found in each picture header (e.g., PH 1512).

The DCI 1502, the VPS 1504, the SPS 1506, and the PPS 1508 are contained in different types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important data that can apply to a number of VCL NAL units) and supplemental enhancement information (timing information and other supplemental data that may enhance usability of the decoded video signal but are not necessary for decoding the values of the samples in the video pictures).

In an embodiment, the DCI 1502 is contained in a non-VCL NAL unit designated as a DCI NAL unit or a DPS NAL unit. That is, the DCI NAL unit has a DCI NAL unit type (NUT) and the DPS NAL unit has a DPS NUT. In an embodiment, the VPS 1504 is contained in a non-VCL NAL unit designated as a VPS NAL unit. Therefore, the VPS NAL unit has a VPS NUT. In an embodiment, the SPS 1506 is a non-VCL NAL unit designated as an SPS NAL unit. Therefore, the SPS NAL unit has an SPS NUT. In an embodiment, the PPS 1508 is contained in a non-VCL NAL unit designated as a PPS NAL unit. Therefore, the PPS NAL unit has a PPS NUT.

The PH 1512 is a syntax structure containing syntax elements that apply to all slices (e.g., slices 1518) of a coded picture (e.g., picture 1514). In an embodiment, the PH 1512 is in a type of non-VCL NAL unit designated a PH NAL unit. Therefore, the PH NAL unit has a PH NUT (e.g., PH_NUT).

In an embodiment, the PH NAL unit associated with the PH 1512 has a temporal ID and a layer ID. The temporal ID identifier indicates the position of the PH NAL unit, in time, relative to the other PH NAL units in the bitstream (e.g., bitstream 1500). The layer ID indicates the layer that contains the PH NAL unit. In an embodiment, the temporal ID is similar to, but different from, the picture order count (POC). The POC uniquely identifies each picture in order. In a single layer bitstream, temporal ID and POC would be the same. In a multi-layer bitstream, pictures in the same access unit (AU) would have different POCs, but the same temporal ID.

In an embodiment, the PH NAL unit precedes the VCL NAL unit containing the first slice 1518 of the associated picture 1514. This establishes the association between the PH 1512 and the slices 1518 of the picture 1514 associated with the PH 1512 without the need to have a picture header ID signaled in the PH 1512 and referred to from the slice header 1520. Consequently, it can be inferred that all VCL NAL units between two PHs 1512 belong to the same picture 1514 and that the picture 1514 is associated with the first PH 1512 between the two PHs 1512. In an embodiment, the first VCL NAL unit that follows a PH 1512 contains the first slice 1518 of the picture 1514 associated with the PH 1512.

In an embodiment, the PH NAL unit follows picture level parameter sets (e.g., the PPS) or higher level parameter sets such as the DCI (a.k.a., the DPS), the VPS, the SPS, the PPS, etc., having both a temporal ID and a layer ID less than the temporal ID and layer ID of the PH NAL unit, respectively. Consequently, those parameter sets are not repeated within a picture or an access unit. Because of this ordering, the PH 1512 can be resolved immediately. That is, parameter sets that contain parameters relevant to an entire picture are positioned in the bitstream before the PH NAL unit. Anything that contains parameters for part of a picture is positioned after the PH NAL unit.

In one alternative, the PH NAL unit follows picture level parameter sets and prefix supplemental enhancement information (SEI) messages, or higher level parameter sets such as the DCI (a.k.a., the DPS), the VPS, the SPS, the PPS, the APS, the SEI message, etc.

The picture 1514 is an array of luma samples in monochrome format or an array of luma samples and two corresponding arrays of chroma samples in 4:2:0, 4:2:2, and 4:4:4 color format.

The picture 1514 may be either a frame or a field. However, in one CVS 1516, either all pictures 1514 are frames or all pictures 1514 are fields. The coded video sequence (CVS) 1516 is a coded video sequence for every coded layer video sequence (CLVS) in the video bitstream 1500. Notably, the CVS 1516 and the CLVS are the same when the video bitstream 1500 includes a single layer. The CVS 1516 and the CLVS are only different when the video bitstream 1500 includes multiple layers.

Each picture 1514 contains one or more slices 1518. A slice 1518 is an integer number of complete tiles or an integer number of consecutive complete coding tree unit (CTU) rows within a tile of a picture (e.g., picture 1514). Each slice 1518 is exclusively contained in a single NAL unit (e.g., a VCL NAL unit). A tile (not shown) is a rectangular region of CTUs within a particular tile column and a particular tile row in a picture (e.g., picture 1514). A CTU (not shown) is a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB (not shown) is an N×N block of samples for some value of N such that the division of a component into CTBs is a partitioning. A block (not shown) is an M×N (M-column by N-row) array of samples (e.g., pixels), or an M×N array of transform coefficients.

In an embodiment, each slice 1518 contains a slice header 1520. A slice header 1520 is the part of the coded slice 1518 containing the data elements pertaining to all tiles or CTU rows within a tile represented in the slice 1518. That is, the slice header 1520 contains information about the slice 1518 such as, for example, the slice type, which of the reference pictures will be used, and so on.

The pictures 1514 and their slices 1518 comprise data associated with the images or video being encoded or decoded. Thus, the pictures 1514 and their slices 1518 may be simply referred to as the payload or data being carried in the bitstream 1500.

The bitstream 1500 may also contain one or more SEI messages, which contain supplemental enhancement information. SEI messages can contain various types of data that indicate the timing of the video pictures or describe various properties of the coded video or how the coded video can be used or enhanced. SEI messages are also defined that can contain arbitrary user-defined data. SEI messages do not affect the core decoding process, but can indicate how the video is recommended to be post-processed or displayed. Some other high-level properties of the video content are conveyed in video usability information (VUI), such as the indication of the color space for interpretation of the video content. As new color spaces have been developed, such as for high dynamic range and wide color gamut video, additional VUI identifiers have been added to indicate them.

Those skilled in the art will appreciate that the bitstream 1500 may contain other parameters and information in practical applications.

Figure 16:
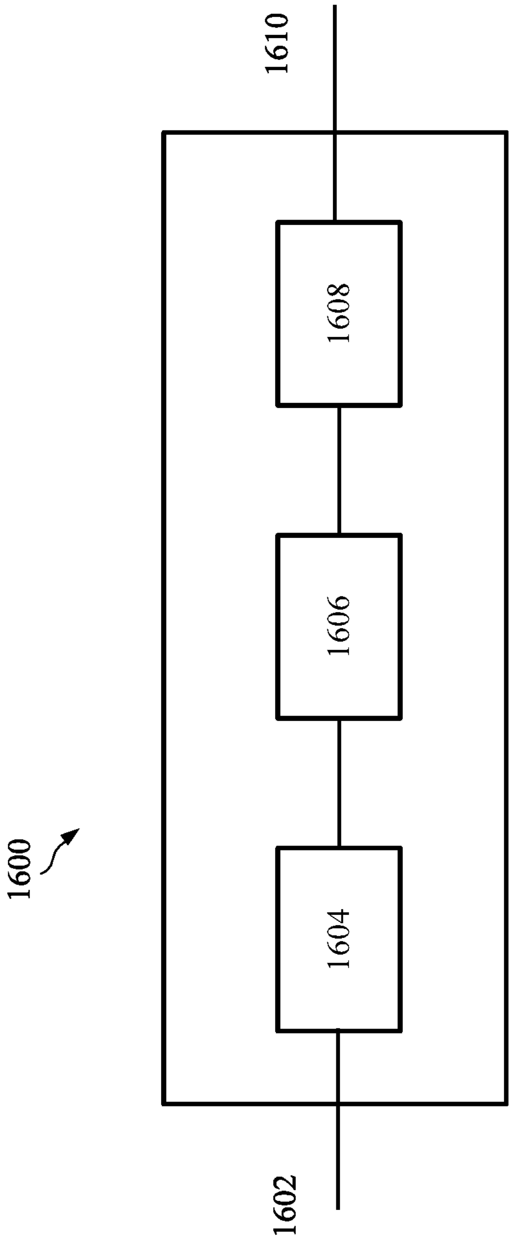
FIG. 16 is a block diagram showing an example video processing system.

FIG. 16 is a block diagram showing an example video processing system 1600 in which various techniques disclosed herein may be implemented. Various implementations may include some or all of the components of the video processing system 1600. The video processing system 1600 may include input 1602 for receiving video content. The video content may be received in a raw or uncompressed format, e.g., 8 or 10 bit multi-component pixel values, or may be in a compressed or encoded format. The input 1602 may represent a network interface, a peripheral bus interface, or a storage interface. Examples of network interface include wired interfaces such as Ethernet, passive optical network (PON), etc. and wireless interfaces such as Wi-Fi or cellular interfaces.

The video processing system 1600 may include a coding component 1604 that may implement the various coding or encoding methods described in the present document. The coding component 1604 may reduce the average bitrate of video from the input 1602 to the output of the coding component 1604 to produce a coded representation of the video. The coding techniques are therefore sometimes called video compression or video transcoding techniques. The output of the coding component 1604 may be either stored, or transmitted via a communication connection, as represented by the component 1606. The stored or communicated bitstream (or coded) representation of the video received at the input 1602 may be used by the component 1608 for generating pixel values or displayable video that is sent to a display interface 1610. The process of generating user-viewable video from the bitstream representation is sometimes called video decompression. Furthermore, while certain video processing operations are referred to as "coding" operations or tools, it will be appreciated that the coding tools or operations are used by an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 17:
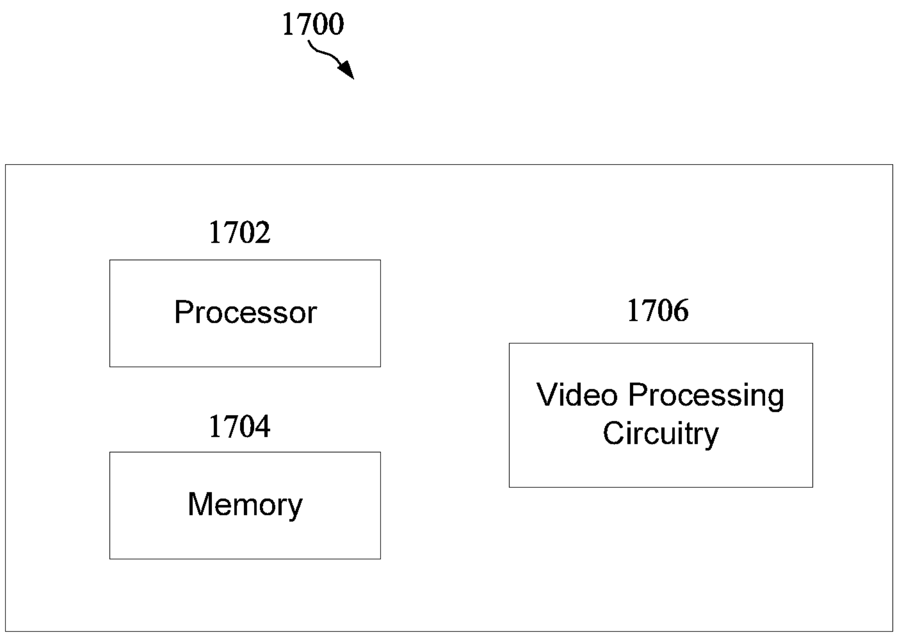
FIG. 17 is a block diagram of a video processing apparatus.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706 (a.k.a., video processing circuitry). The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document. In some embodiments, the hardware 1706 may be partly or completely located within the processor 1702, e.g., a graphics processor.

Figure 18:
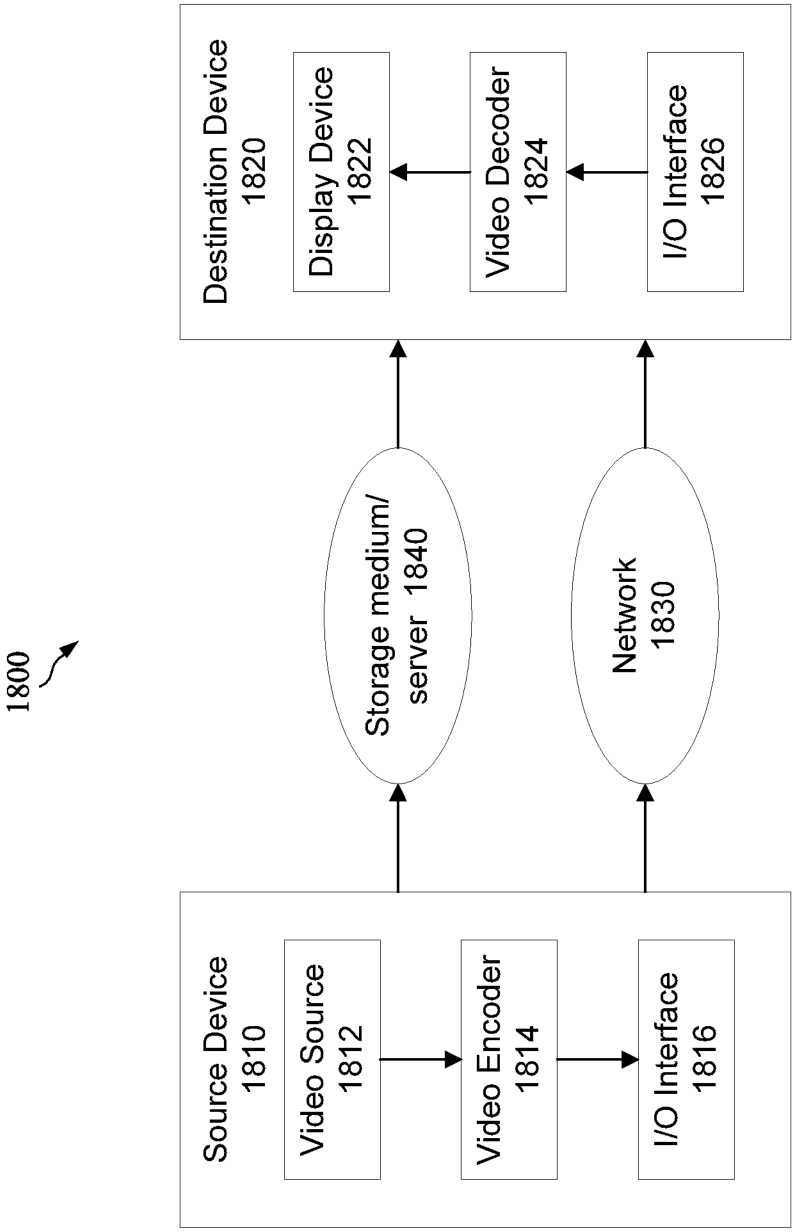
FIG. 18 is a block diagram that illustrates an example video coding system.

FIG. 18 is a block diagram that illustrates an example video coding system 1800 that may utilize the techniques of this disclosure. As shown in FIG. 18, the video coding system 1800 may include a source device 1810 and a destination device 1820. Source device 1810 generates encoded video data which may be referred to as a video encoding device. Destination device 1820 may decode the encoded video data generated by source device 1810 which may be referred to as a video decoding device.

Source device 1810 may include a video source 1812, a video encoder 1814, and an input/output (I/O) interface 1816.

Video source 1812 may include a source such as a video capture device, an interface to receive video data from a video content provider, and/or a computer graphics system for generating video data, or a combination of such sources. The video data may comprise one or more pictures. Video encoder 1814 encodes the video data from video source 1812 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1816 may include a modulator/demodulator (modem) and/or a transmitter. The encoded video data may be transmitted directly to destination device 1820 via I/O interface 1816 through network 1830. The encoded video data may also be stored onto a storage medium/server 1840 for access by destination device 1820.

Destination device 1820 may include an I/O interface 1826, a video decoder 1824, and a display device 1822.

I/O interface 1826 may include a receiver and/or a modem. I/O interface 1826 may acquire encoded video data from the source device 1810 or the storage medium/server 1840. Video decoder 1824 may decode the encoded video data. Display device 1822 may display the decoded video data to a user. Display device 1822 may be integrated with the destination device 1820, or may be external to destination device 1820 which may be configured to interface with an external display device.

Video encoder 1814 and video decoder 1824 may operate according to a video compression standard, such as the High Efficiency Video Coding (HEVC) standard, Versatile Video Coding (VVC) standard, and other current and/or further standards.

Figure 19:
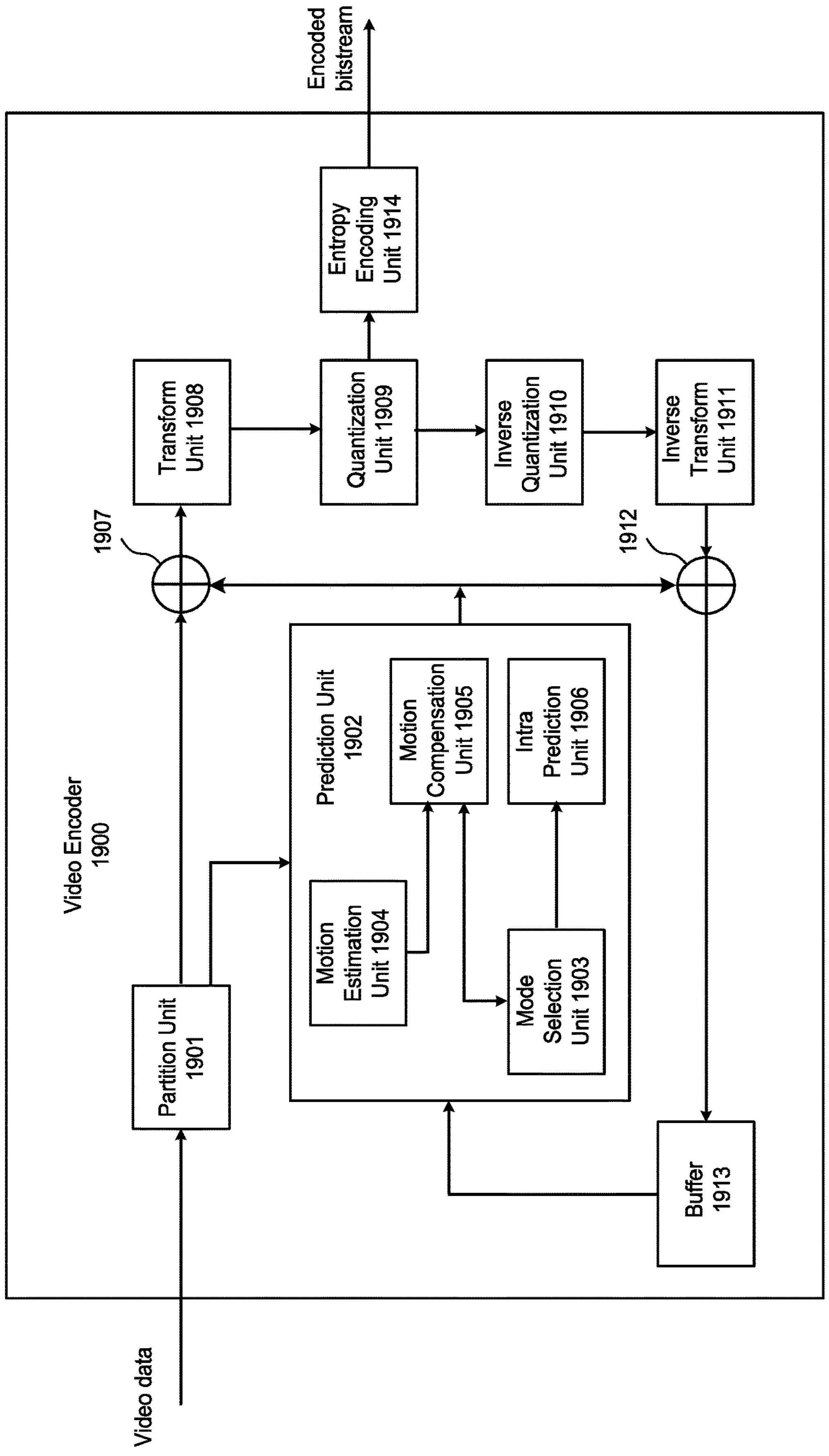
FIG. 19 is a block diagram illustrating an example of video encoder.

FIG. 19 is a block diagram illustrating an example of video encoder 1900, which may be video encoder 1814 in the video coding system 1800 illustrated in FIG. 18.

Video encoder 1900 may be configured to perform any or all of the techniques of this disclosure. In the example of FIG. 19, video encoder 1900 includes a plurality of functional components. The techniques described in this disclosure may be shared among the various components of video encoder 1900. In some examples, a processor may be configured to perform any or all of the techniques described in this disclosure.

The functional components of video encoder 1900 may include a partition unit 1901, a prediction unit 1902 which may include a mode selection unit 1903, a motion estimation unit 1904, a motion compensation unit 1905 and an intra prediction unit 1906, a residual generation unit 1907, a transform unit 1908, a quantization unit 1909, an inverse quantization unit 1910, an inverse transform unit 1911, a reconstruction unit 1912, a buffer 1913, and an entropy encoding unit 1914.

In other examples, video encoder 1900 may include more, fewer, or different functional components. In an example, prediction unit 1902 may include an intra block copy (IBC) unit. The IBC unit may perform prediction in an IBC mode in which at least one reference picture is a picture where the current video block is located.

Furthermore, some components, such as motion estimation unit 1904 and motion compensation unit 1905 may be highly integrated, but are represented in the example of FIG. 19 separately for purposes of explanation.

Partition unit 1901 may partition a picture into one or more video blocks. Video encoder 1814 and video decoder 1824 of FIG. 18 may support various video block sizes.

Mode selection unit 1903 may select one of the coding modes, intra or inter, e.g., based on error results, and provide the resulting intra- or inter-coded block to a residual generation unit 1907 to generate residual block data and to a reconstruction unit 1912 to reconstruct the encoded block for use as a reference picture. In some examples, mode selection unit 1903 may select a combination of intra and inter prediction (CIIP) mode in which the prediction is based on an inter prediction signal and an intra prediction signal. Mode selection unit 1903 may also select a resolution for a motion vector (e.g., a sub-pixel or integer pixel precision) for the block in the case of inter-prediction.

To perform inter prediction on a current video block, motion estimation unit 1904 may generate motion information for the current video block by comparing one or more reference frames from buffer 1913 to the current video block. Motion compensation unit 1905 may determine a predicted video block for the current video block based on the motion information and decoded samples of pictures from buffer 1913 other than the picture associated with the current video block.

Motion estimation unit 1904 and motion compensation unit 1905 may perform different operations for a current video block, for example, depending on whether the current video block is in an I slice, a P slice, or a B slice. I-slices (or I-frames) are the least compressible but don't require other video frames to decode. S-slices (or P-frames) can use data from previous frames to decompress and are more compressible than I-frames. B-slices (or B-frames) can use both previous and forward frames for data reference to get the highest amount of data compression.

In some examples, motion estimation unit 1904 may perform uni-directional prediction for the current video block, and motion estimation unit 1904 may search reference pictures of list 0 or list 1 for a reference video block for the current video block. Motion estimation unit 1904 may then generate a reference index that indicates the reference picture in list 0 or list 1 that contains the reference video block and a motion vector that indicates a spatial displacement between the current video block and the reference video block. Motion estimation unit 1904 may output the reference index, a prediction direction indicator, and the motion vector as the motion information of the current video block. Motion compensation unit 1905 may generate the predicted video block of the current block based on the reference video block indicated by the motion information of the current video block.

In other examples, motion estimation unit 1904 may perform bi-directional prediction for the current video block, motion estimation unit 1904 may search the reference pictures in list 0 for a reference video block for the current video block and may also search the reference pictures in list 1 for another reference video block for the current video block. Motion estimation unit 1904 may then generate reference indexes that indicate the reference pictures in list 0 and list 1 containing the reference video blocks and motion vectors that indicate spatial displacements between the reference video blocks and the current video block. Motion estimation unit 1904 may output the reference indexes and the motion vectors of the current video block as the motion information of the current video block. Motion compensation unit 1905 may generate the predicted video block of the current video block based on the reference video blocks indicated by the motion information of the current video block.

In some examples, motion estimation unit 1904 may output a full set of motion information for decoding processing of a decoder.

In some examples, motion estimation unit 1904 may not output a full set of motion information for the current video. Rather, motion estimation unit 1904 may signal the motion information of the current video block with reference to the motion information of another video block. For example, motion estimation unit 1904 may determine that the motion information of the current video block is sufficiently similar to the motion information of a neighboring video block.

In one example, motion estimation unit 1904 may indicate, in a syntax structure associated with the current video block, a value that indicates to the video decoder 1824 that the current video block has the same motion information as another video block.

In another example, motion estimation unit 1904 may identify, in a syntax structure associated with the current video block, another video block and a motion vector difference (MVD). The motion vector difference indicates a difference between the motion vector of the current video block and the motion vector of the indicated video block. The video decoder 1824 may use the motion vector of the indicated video block and the motion vector difference to determine the motion vector of the current video block.

As discussed above, video encoder 1814 may predictively signal the motion vector. Two examples of predictive signaling techniques that may be implemented by video encoder 1814 include advanced motion vector prediction (AMVP) and merge mode signaling.

Intra prediction unit 1906 may perform intra prediction on the current video block. When intra prediction unit 1906 performs intra prediction on the current video block, intra prediction unit 1906 may generate prediction data for the current video block based on decoded samples of other video blocks in the same picture. The prediction data for the current video block may include a predicted video block and various syntax elements.

Residual generation unit 1907 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block, for example in a skip mode, and residual generation unit 1907 may not perform the subtracting operation.

Transform unit 1908 may generate one or more transform coefficient video blocks for the current video block by applying one or more transforms to a residual video block associated with the current video block.

After transform unit 1908 generates a transform coefficient video block associated with the current video block, quantization unit 1909 may quantize the transform coefficient video block associated with the current video block based on one or more quantization parameter (QP) values associated with the current video block.

Inverse quantization unit 1910 and inverse transform unit 1911 may apply inverse quantization and inverse transforms to the transform coefficient video block, respectively, to reconstruct a residual video block from the transform coefficient video block. Reconstruction unit 1912 may add the reconstructed residual video block to corresponding samples from one or more predicted video blocks generated by the prediction unit 1902 to produce a reconstructed video block associated with the current block for storage in the buffer 1913.

After reconstruction unit 1912 reconstructs the video block, loop filtering operation may be performed to reduce video blocking artifacts in the video block.

Entropy encoding unit 1914 may receive data from other functional components of the video encoder 1900. When entropy encoding unit 1914 receives the data, entropy encoding unit 1914 may perform one or more entropy encoding operations to generate entropy encoded data and output a bitstream that includes the entropy encoded data.

Figure 20:
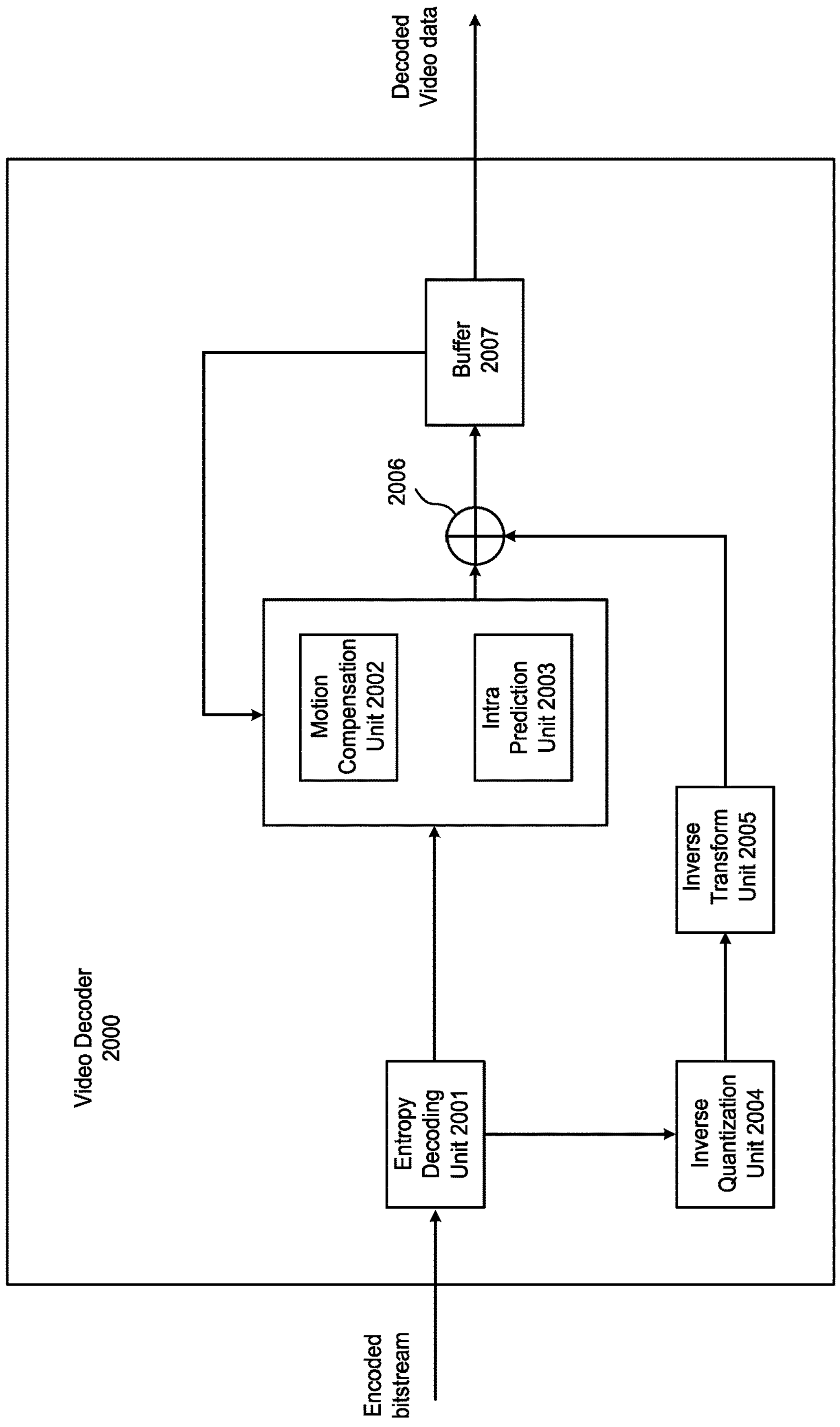
FIG. 20 is a block diagram illustrating an example of video decoder.

FIG. 20 is a block diagram illustrating an example of video decoder 2000, which may be video decoder 1824 in the video coding system 1800 illustrated in FIG. 18.

The video decoder 2000 may be configured to perform any or all of the techniques of this disclosure. In the example of FIG. 20, the video decoder 2000 includes a plurality of functional components. The techniques described in this disclosure may be shared among the various components of the video decoder 2000. In some examples, a processor may be configured to perform any or all of the techniques described in this disclosure.

In the example of FIG. 20, video decoder 2000 includes an entropy decoding unit 2001, a motion compensation unit 2002, an intra prediction unit 2003, an inverse quantization unit 2004, an inverse transformation unit 2005, a reconstruction unit 2006, and a buffer 2007. Video decoder 2000 may, in some examples, perform a decoding pass generally reciprocal to the encoding pass described with respect to video encoder 1814 (FIG. 18).

Entropy decoding unit 2001 may retrieve an encoded bitstream. The encoded bitstream may include entropy coded video data (e.g., encoded blocks of video data). Entropy decoding unit 2001 may decode the entropy coded video data, and from the entropy decoded video data, motion compensation unit 2002 may determine motion information including motion vectors, motion vector precision, reference picture list indexes, and other motion information. Motion compensation unit 2002 may, for example, determine such information by performing the AMVP and merge mode signaling.

Motion compensation unit 2002 may produce motion compensated blocks, possibly performing interpolation based on interpolation filters. Identifiers for interpolation filters to be used with sub-pixel precision may be included in the syntax elements.

Motion compensation unit 2002 may use interpolation filters as used by video encoder 1814 during encoding of the video block to calculate interpolated values for sub-integer pixels of a reference block. Motion compensation unit 2002 may determine the interpolation filters used by video encoder 1814 according to received syntax information and use the interpolation filters to produce predictive blocks.

Motion compensation unit 2002 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 2003 may use intra prediction modes, for example, received in the bitstream to form a prediction block from spatially adjacent blocks. Inverse quantization unit 2004 inverse quantizes, i.e., de-quantizes, the quantized video block coefficients provided in the bitstream and decoded by entropy decoding unit 2001. Inverse transform unit 2005 applies an inverse transform.

Reconstruction unit 2006 may sum the residual blocks with the corresponding prediction blocks generated by motion compensation unit 2002 or intra-prediction unit 2003 to form decoded blocks. If desired, a deblocking filter may also be applied to filter the decoded blocks in order to remove blockiness artifacts. The decoded video blocks are then stored in buffer 2007, which provides reference blocks for subsequent motion compensation/intra prediction and also produces decoded video for presentation on a display device.

Figure 21:
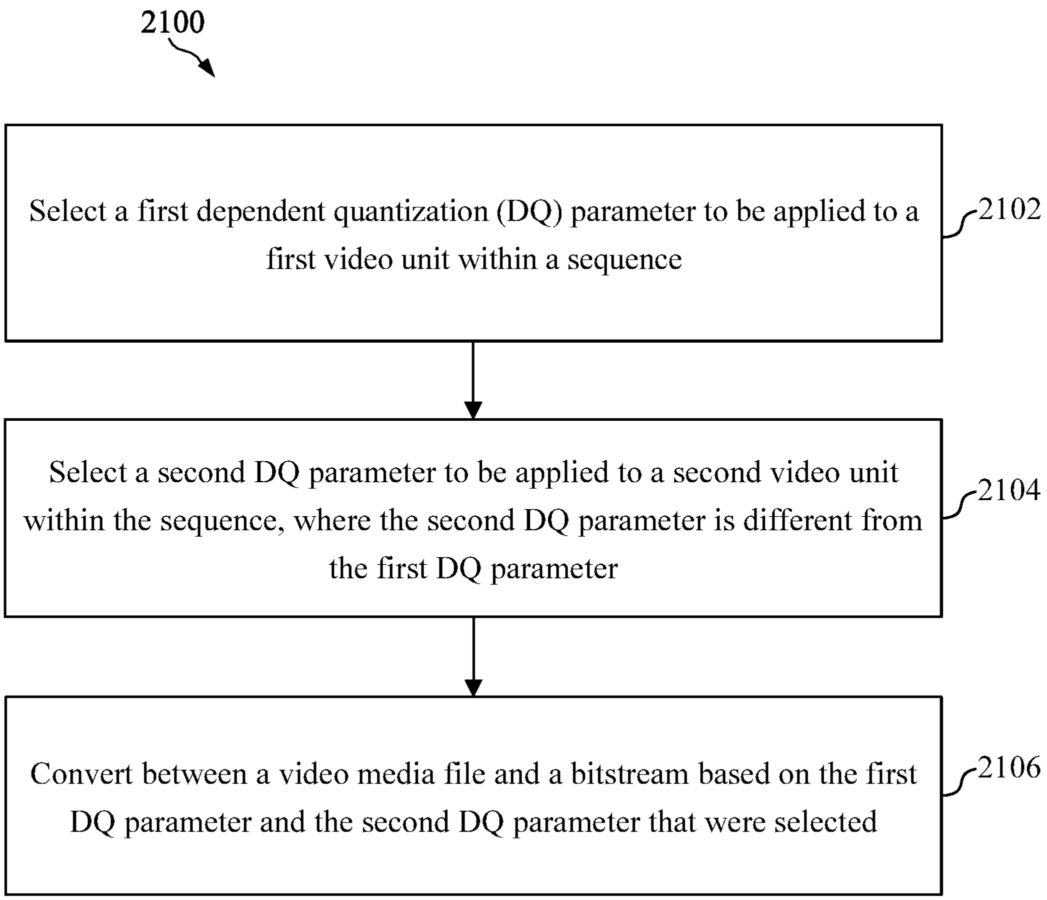
FIG. 21 is a method for coding video data according to an embodiment of the disclosure.

FIG. 21 is a method 2100 for coding video data according to an embodiment of the disclosure. The method 2100 may be performed by a coding apparatus (e.g., an encoder) having a processor and a memory. The method 2100 may be implemented when using dependent quantization parameters in the video coding process.

In block 2102, the coding apparatus selects a first dependent quantization (DQ) parameter to be applied to a first video unit within a sequence. In block 2104, the coding apparatus selects a second DQ parameter to be applied to a second video unit within the sequence, where the second DQ parameter is different from the first DQ parameter. In block 2106, the coding apparatus converts between a video media file and a bitstream based on the first DQ parameter and the second DQ parameter that were selected.

When implemented in an encoder, converting includes receiving a media file (e.g., a video unit) and encoding the media file into a bitstream based on dependent quantization parameters. When implemented in a decoder, converting includes receiving a bitstream and decoding the bitstream based on the dependent quantization parameters to obtain the media file.

In an embodiment, the first video unit and the second video unit are each a color component, a sub-picture, a slice, a tile, a coding tree unit (CTU), a CTU row, a group of CTUs, a coding unit (CU), a prediction unit (PU), a transform unit (TU), a coding tree block (CTB), a coding block (CB), a prediction block (PB), a transform block (TB), or a region containing more than one sample or pixel.

In an embodiment, the first DQ parameter or the second DQ parameter comprises a number of states N, wherein N is equal to $2^k$, and wherein k is one of 2, 3, 4, 5, 6 or 7.

In an embodiment, the set of available DQ parameters comprises M choices, and wherein M is an integer greater than one.

In an embodiment, the first DQ parameter is selected from a first set of available DQ parameters, wherein the second DQ parameter is selected from a second set of available DQ parameters; and wherein the first set of available DQ parameters is different from the second set of available DQ parameters.

In an embodiment, the first DQ parameter is selected from a first set of states for a first color component, wherein the second DQ parameter is selected from a second set of states for a second color component; and wherein the first color component is different than the second color component.

In an embodiment, the first DQ parameter is a first number of states and the first video unit is a first color component, and wherein the second DQ parameter is a second number of states and the second video unit is a second color component.

In an embodiment, the first color component is one of Y, Cb, or Cr from a YCbCr color space or is one of R, G, B in an RGB color space, where Y is a luma component, Cb is a blue chroma component, Cr is a red chroma component, R is a red color component, G is a green color component, and B is a blue color component.

In an embodiment, the first DQ parameter is a first number of states or selected from a first set of states, wherein the second DQ parameter is a second number of states or selected from a second set of states, and wherein the first DQ parameter and the second DQ parameter depend on profile, tier, level, layers, or combinations thereof.

In an embodiment, the first DQ parameter is a first number of states or selected from a first set of states, wherein the second DQ parameter is a second number of states or selected from a second set of states, wherein the first DQ parameter is applied to an I slice, and wherein the second DQ parameter is applied to a P slice or a B slice, where the I slice indicates intra prediction, where the P slice indicates uni-directional inter prediction, and where the B slice indicates bi-directional inter prediction.

In an embodiment, the first DQ parameter is a first number of states or selected from a first set of states, wherein the second DQ parameter is a second number of states or selected from a second set of states, and wherein the first DQ parameter and the second DQ parameter depend on a temporal layer identifier (ID).

In an embodiment, the first DQ parameter is a first number of states or selected from a first set of states, wherein the second DQ parameter is a second number of states or selected from a second set of states, and wherein the first DQ parameter and the second DQ parameter depend on a prediction mode in the first video unit and the second video unit.

In an embodiment, the first DQ parameter is a first number of states or selected from a first set of states, wherein the second DQ parameter is a second number of states or selected from a second set of states, and wherein the first DQ parameter and the second DQ parameter depend on whether or not the first video unit or the second video unit is coded with transform skip.

In an embodiment, the first DQ parameter is a first number of states or selected from a first set of states, wherein the second DQ parameter is a second number of states or selected from a second set of states, and wherein the first DQ parameter and the second DQ parameter depend on whether the first video unit or the second video unit is coded with regular residual coding (RRC) or transform skip residual coding (TSRC).

In an embodiment, the first DQ parameter is a first number of states or selected from a first set of states, wherein the second DQ parameter is a second number of states or selected from a second set of states, and wherein the first DQ parameter and the second DQ parameter depend on whether one or more coding tools are applied or not.

In an embodiment, the first DQ parameter is a first number of states or selected from a first set of states, wherein the second DQ parameter is a second number of states or selected from a second set of states, and wherein the first DQ parameter and the second DQ parameter depend on whether a size or dimension of the first video unit or the second video unit.

In an embodiment, the first DQ parameter is a first number of states or selected from a first set of states, wherein the second DQ parameter is a second number of states or selected from a second set of states, and wherein the first DQ parameter and the second DQ parameter depend on block partitioning of the first video unit or the second video unit.

In an embodiment, the method further comprises selecting a third DQ parameter to be applied to the first video unit and selecting a fourth DQ parameter to be applied to the second video unit, wherein the third DQ parameter is different from the first DQ parameter, and wherein the fourth DQ parameter is different from the second DQ parameter.

In an embodiment, the first DQ parameter is a first number of states or selected from a first set of states, wherein the second DQ parameter is a second number of states or selected from a second set of states, and wherein the first DQ parameter and the second DQ parameter depend on whether or not the first video unit or the second video unit is coded with transform skip.

In an embodiment, the first DQ parameter is a first number of states or selected from a first set of states, wherein the second DQ parameter is a second number of states or selected from a second set of states, and wherein the first DQ parameter and the second DQ parameter depend on whether the first video unit or the second video unit is coded with regular residual coding (RRC) or transform skip residual coding (TSRC).

In an embodiment, the first DQ parameter is a first number of states or selected from a first set of states, wherein the second DQ parameter is a second number of states or selected from a second set of states, and wherein the first DQ parameter and the second DQ parameter depend on whether one or more coding tools are applied or not.

In an embodiment, the first DQ parameter is a first number of states or selected from a first set of states, wherein the second DQ parameter is a second number of states or selected from a second set of states, and wherein the first DQ parameter and the second DQ parameter depend on whether a size or dimension of the first video unit or the second video unit.

In an embodiment, the first DQ parameter is a first number of states or selected from a first set of states, wherein the second DQ parameter is a second number of states or selected from a second set of states, and wherein the first DQ parameter and the second DQ parameter depend on block partitioning of the first video unit or the second video unit.

In an embodiment, the method further comprises selecting a third DQ parameter to be applied to the first video unit and selecting a fourth DQ parameter to be applied to the second video unit, wherein the third DQ parameter is different from the first DQ parameter, and wherein the fourth DQ parameter is different from the second DQ parameter.

In an embodiment, the first DQ parameter and the second DQ parameter are each signaled at a level of a bitstream where the first video unit and the second video unit are signaled in the bitstream, and wherein the first video unit and the second video unit are each a transform unit (TU), a transform block (TB), a coding unit (CU), or a coding block (CB).

In an embodiment, the first DQ parameter and the second DQ parameter are each signaled at a level of a bitstream different than where the first video unit and the second video unit are signaled in the bitstream, wherein the first video unit and the second video unit are each a coding unit (CU) or a transform unit (TU), and wherein the level of the bitstream signaled is a coding tree unit (CTU).

In an embodiment, whether the first DQ parameter and the second DQ parameter are each signaled as a syntax element in a bitstream depends on a condition, and wherein the condition is based on a current block, a neighboring block, a block dimension, a prediction mode, a transform mode, a residual coding mode, a coded block flag (CBF) value, a position of non-zero coefficients in a block, and a position of a last non-zero coefficient in the block.

In an embodiment, the first DQ parameter and the second DQ parameter are each signaled as a syntax element in a bitstream, and wherein the syntax element is binarized with fixed length coding, truncated unary coding, unary coding, or a flag.

In an embodiment, the first DQ parameter and the second DQ parameter are each signaled as a syntax element in a bitstream, and wherein the syntax element is bypass coded.

In an embodiment, the first DQ parameter and the second DQ parameter are each signaled as a syntax element in a bitstream, and wherein the syntax element is context-coded.

In an embodiment, the first DQ parameter is a first number of states or selected from a first set of states, wherein the second DQ parameter is a second number of states or selected from a second set of states, and wherein the first DQ parameter and the second DQ parameter are each derived from coded information in a bitstream instead of being explicitly signaled in the bitstream.

In an embodiment, the coded information comprises a size or dimension of the first video unit and the second video unit, a number of coefficients in the first video unit and the second video unit, a last scan position of the first video unit and the second video unit, or a color component the first video unit and the second video unit.

In an embodiment, the coded information comprises a prediction mode, a transform mode, a residual coding method applied to a current block, an indication of whether or not a coding tool has been applied to a current block, or information corresponding to a neighboring block of a current block.

In an embodiment, the method 2100 may utilize or incorporate one or more of the features or processes of the other methods disclosed herein.

A listing of solutions preferred by some embodiments is provided next.

The following solutions show example embodiments of techniques discussed in the present disclosure (e.g., Example 1).

1. A method of video processing, comprising: determining, for a conversion between a video unit of a video and a bitstream of the video, a parameter of a dependent quantization (DQ) scheme used for representing the video unit in the bitstream according a rule based on a type of the video unit; and performing the conversion based on the determining.

2. The method of solution 1, wherein the parameter of the DQ scheme comprises a number of states N used in the DQ scheme.

3. The method of solution 1, wherein N is equal to $2^k$, wherein k is one of 2, 3, 4, 5, 6 or 7.

4. The method of solution 1, wherein the rule specifies that the type of the video unit allows for selection of the parameter of the DQ scheme from among M choices, where M is an integer.

5. The method of solution 4, wherein the rule specifies that the number M depends on a color component of the video unit.

6. The method of solutions 1-5, wherein the rule specifies that the bitstream includes an indication of the parameter of the DQ scheme.

7. The method of solution 1, wherein the rule specifies that the parameter of the DQ scheme depends on coded information of the video unit.

8. The method of solution 7, wherein the coded information comprises a profile or a tier or a level of the bitstream.

9. The method of solution 7, wherein the coded information comprises a temporal identifier of the video unit.

10. A method of video processing, comprising: performing a conversion between a video unit of a video and a bitstream of the video, wherein the bitstream conforms to a format rule, wherein the rule specifies whether or how a syntax element indicating whether a change is allowed to a dependent quantization (DQ) parameter used for coding the video unit is included in the bitstream.

11. The method of solution 10, wherein the rule specifies that the syntax element is included at a level of the video unit.

12. The method of solution 10, wherein the rule specifies that the syntax element is signaled at a level that is higher than the video unit.

13. The method of solution 10, wherein the rule specifies that the syntax element is conditionally included in the bitstream based on a signaling rule.

14. The method of solution 13, wherein the signaling rule depends on a coded information of the video unit or a neighboring video unit.

15. The method of solution 13, wherein the signaling rule depends on a coded block flag for the video unit.

16. The method of any of solutions 10-15, wherein the rule specifies that the syntax element is bypass coded.

17. The method of any of solutions 10-15, wherein the rule specifies that the syntax element is context coded.

18. A method of video processing, comprising: determining a number of states or a set of allowed number of states of a dependent quantization (DQ) used for a conversion between a video unit of a video and a bitstream of the video according to a rule; and performing the conversion based on the determining; wherein the rule specifies that the number of states of the set of allowed number of states is dependent on a coded information of the video unit.

19. The method of solution 18, wherein the coded information comprises a size or a dimension of the video unit.

20. The method of solution 18 or 19, wherein the coded information comprises a number of coded coefficients of the video unit.

21. The method of any of solutions 18-20, wherein the coded information includes a last scan position of coded coefficients of the video unit.

22. The method of any of solutions 18-21, wherein the coded information included a color component of the video unit.

23. The method of any of solutions 18-21, wherein the coded information included a prediction mode of the video unit.

24. The method of any of solutions 1-23, wherein use of the rule is indicated in a syntax element at a sequence level, a picture level, a slice level, or a tile group level.

25. The method of any of solutions 1-23 where the use of the rule is indicated in a sequence header, a picture header, a sequence parameter set, a video parameter set, a picture parameter set, an adaptation parameter set, a slice header, a tile group header, a decoding parameter set of a decoding capability information.

26. The method of any of solutions 1-25, wherein the rule is dependent on a color format of the video.

27. The method of any of solutions 1-26, wherein the rule is dependent on a partitioning scheme used for partitioning the video unit.

28. The method of any of the above solutions, wherein the video unit comprises a sub-picture, a slice, a tile, a coding tree unit (CTU), a CTU row, groups of CTU, a coding unit (CU), a prediction unit (PU), a transform unit (TU), a coding tree block (CTB), a coding block (CB), a prediction block (PB), a transform block (TB), or a region comprises multiple video samples.

29. The method of any of solutions 1-28, wherein the conversion comprises generating the video from the bitstream or generating the bitstream from the video.

30. A method of storing a bitstream on a computer-readable medium, comprising generating a bitstream according to a method recited in any one or more of solutions 1-29 and storing the bitstream on the computer-readable medium.

31. A computer-readable medium having a bitstream of a video stored thereon, the bitstream, when processed by a processor of a video decoder, causing the video decoder to generate the video, wherein the bitstream is generated according to a method recited in one or more of solutions 1-29.

32. A video decoding apparatus comprising a processor configured to implement a method recited in one or more of solutions 1-29.

33. A video encoding apparatus comprising a processor configured to implement a method recited in one or more of solutions 1-29.

34. A computer program product having computer code stored thereon, the code, when executed by a processor, causes the processor to implement a method recited in any of solutions 1-29.

35. A computer readable medium on which a bitstream complying to a bitstream format that is generated according to any of solutions 1-29.

36. A method, an apparatus, a bitstream generated according to a disclosed method or a system described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disk read-only memory (CD ROM) and digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

determining, during a conversion between a video unit and a bitstream of the video unit, a dependent quantization (DQ) operation to be used for coding the video unit;

applying, during the process of the DQ operation, different choices of DQ parameters to different video units within a sequence, wherein the different choices of DQ parameters comprise a number of states; and performing the conversion based on the determining and the applying, wherein a first set of allowed numbers of states used in the DQ parameters is used for a first color component, a second set of allowed numbers of states used in the DQ parameters is used for a second color component; and the first color component is different from the second color component.

2. The method of claim 1, wherein the number of states is equal to N, and wherein N is equal to $2^k$, and k is one of 2, 3, 4, 5, 6 or 7.

3. The method of claim 1, wherein the different choices of DQ parameters are selected from different sets of available DQ parameters, a set of available DQ parameters comprises M choices, and the M choices of DQ parameters are used for the video unit, wherein M is an integer greater than 1.

4. The method of claim 3, wherein M is equal to 2 and the set of available DQ parameters comprises {4-state DQ, 8-state DQ}, {4-state DQ, 16-state DQ}, or {8-state DQ, 16-state DQ}, or wherein M is equal to 3 and the set of available DQ parameters comprises {4-state DQ, 8-state DQ, 16-state DQ}.

5. The method of claim 1, wherein the number of states or the first or second set of allowed numbers of states used in the DQ parameters is depended on coded information, a picture, a slice type, a temporal layer identifier (ID), whether the video unit is coded with transform skip, whether the video unit is coded with regular residual coding or transform skip residual coding, a profile, a tier, a level, layers, a prediction mode in the video unit, a size or dimension of the video unit, a block partitioning of the video unit, or whether one or more coding tools are applied or not.

6. The method of claim 1, wherein the number of states or the first or second set of allowed numbers of states used in the DQ parameters is allowed to be changed in the video unit, and an indication of the number of states or an indication of the first or second set of allowed numbers of states used in the DQ parameters is signaled as a syntax element.

7. The method of claim 1, wherein the number of states or the first or second set of allowed numbers of states used in the DQ parameters is allowed to be changed in the video unit, and the number of states or the first or second set of allowed numbers of states used in the DQ parameters is derived from coded information in the bitstream instead of being explicitly included in the bitstream.

8. The method of claim 7, wherein the coded information comprises a size or dimension of the video unit.

9. The method of claim 8, wherein an $N_1$-state DQ is used in the video unit when W*H is less than $T_1$, and an $N_2$-state DQ is used in the video unit when W*H is larger than or equal to $T_1$, wherein $N_1$ and $N_2$ are different states, W is a width of the video unit, H is a height of the video unit, and $T_1$ is an integer; or wherein an $N_1$-state DQ is used in the video unit when W/H or H/W is less than $T_2$, an $N_2$-state DQ is used in the video unit when W/H or H/W is larger than or equal to $T_2$, wherein $N_1$ and $N_2$ are different states, W is a width of the video unit, H is a height of the video unit, and $T_2$ is an integer.

10. The method of claim 7, wherein the coded information comprises a number of coefficients in the video unit.

11. The method of claim 10, wherein an $N_1$-state DQ is used in the video unit when the number of coefficients is less than $T_1$, and an $N_2$-state DQ is used in the video unit when the number of coefficients is larger than or equal to $T_1$, wherein $N_1$ and $N_2$ are different states, and $T_1$ is an integer.

12. The method of claim 7, wherein the coded information comprises a last scan position or a syntax element indicating the last scan position in the video unit;

wherein the last scan position is denoted by lastScanPos, and the syntax element indicating the last scan position is denoted by last_sig_coeff_x_prefix, last_sig_coeff_y_prefix, last_sig_coeff_x_suffix, or last_sig_coeff_y_suffix.

13. The method of claim 12, wherein an $N_1$-state DQ is used in the video unit when the last scan position is less than $T_1$, and an $N_2$-state DQ is used in the video unit when the last scan position is larger than or equal to $T_1$, wherein $N_1$ and $N_2$ are different states, and $T_1$ is an integer.

14. The method of claim 7, wherein the coded information comprises a color component, wherein an $N_1$-state DQ is used in a Y component in a YCbCr color format, an $N_2$-state DQ is used in a Cb component and a Cr component in the YCbCr color format, and wherein $N_1$ and $N_2$ are different states.

15. The method of claim 7, wherein the coded information comprises a prediction mode, and the prediction mode comprises one of an intra prediction mode, an inter prediction mode, an intra block copy (IBC) mode, and a palette mode; or wherein the coded information comprises a transform mode, and the transform mode comprises one of a transform skip mode, a non-transform-skip mode, an explicit multiple transform set (MTS) mode, an implicit MTS mode, and different MTS types; or wherein the coded information comprises a residual coding method, and the residual coding method comprises regular residual coding (RRC) or transform skip based residual coding (TSRC); or wherein the coded information comprises an indication of whether or not a coding tool has been applied to a current block, and the coding tool comprises matrix-based intra-prediction (MIP), multiple reference line (MRL), inter frame stripe prediction (ISP), decoder-side intra mode derivation (DIMD), MTS, Low Frequency Non-Separable Transform (LFNST), subblock transform (SBT), geometric partition (GEO), combined inter- and intra-prediction (CIIP), merge mode with motion vector difference (MMVD), Subblock-based Temporal Motion Vector Prediction (SbTMVP), overlapped block motion compensation (OBMC), Frame Rate Up-Conversion (FRUC), IBC, Sign Prediction, Sign hiding, or Adaptive scanning ordering; or wherein the coded information comprises a number of states, residual information, or reconstructed samples corresponding to a neighboring block of a current block in the video unit.

16. The method of claim 1, wherein the conversion comprises encoding the video unit into the bitstream.

17. The method of claim 1, wherein the conversion comprises decoding the video unit from the bitstream.

18. An apparatus for processing video data comprising:

a processor; and a non-transitory memory with instructions thereon, wherein the instructions upon execution by the processor, cause the processor to:

determine, during a conversion between a video unit and a bitstream of the video unit, a dependent quantization (DQ) operation used for coding the video unit;

apply, during the process of the DQ operation, different choices of DQ parameters to different video units within a sequence, wherein the different choices of DQ parameters comprise a number of states; and perform the conversion based on the determining and the applying, wherein a first set of allowed numbers of states used in the DQ parameters is used for a first color component, a second set of allowed numbers of states used in the DQ parameters is used for a second color component; and the first color component is different from the second color component.

19. A method for storing a bitstream of a video, comprising:

determining, for a video unit, a dependent quantization (DQ) operation used for coding the video unit;

applying, during the process of the DQ operation, different choices of DQ parameters to different video units within a sequence, wherein the different choices of DQ parameters comprise a number of states;

generating the bitstream based on the determining and the applying, and storing the bitstream in a non-transitory computer-readable recording medium, wherein a first set of allowed numbers of states used in the DQ parameters is used for a first color component, a second set of allowed numbers of states used in the DQ parameters is used for a second color component; and the first color component is different from the second color component.

* * * * *